US012557415B2

(12) United States Patent
Yoshita et al.

(10) Patent No.: US 12,557,415 B2
(45) Date of Patent: Feb. 17, 2026

(54) IMAGING ELEMENT AND IMAGING DEVICE

(71) Applicant: SONY SEMICONDUCTOR SOLUTIONS CORPORATION, Kanagawa (JP)

(72) Inventors: Ryoto Yoshita, Kanagawa (JP); Yoshimichi Kumagai, Kanagawa (JP); Naoyuki Osawa, Kanagawa (JP); Kengo Nagata, Kanagawa (JP); Masashi Bando, Kanagawa (JP)

(73) Assignee: Sony Semiconductor Solutions Corporation, Kanagawa (JP)

( * ) Notice: Subject to any disclaimer, the term of this patent is extended or adjusted under 35 U.S.C. 154(b) by 550 days.

(21) Appl. No.: 17/998,990

(22) PCT Filed: Apr. 7, 2021

(86) PCT No.: PCT/JP2021/014716
§ 371 (c)(1),
(2) Date: Nov. 16, 2022

(87) PCT Pub. No.: WO2021/241019
PCT Pub. Date: Dec. 2, 2021

(65) Prior Publication Data
US 2023/0215889 A1     Jul. 6, 2023

(30) Foreign Application Priority Data

May 29, 2020  (JP) ................. 2020-095062

(51) Int. Cl.
*H10F 39/00*     (2025.01)
*H10F 39/18*     (2025.01)

(52) U.S. Cl.
CPC ......... *H10F 39/8067* (2025.01); *H10F 39/18* (2025.01); *H10F 39/8057* (2025.01); *H10F 39/8063* (2025.01); *H10F 39/811* (2025.01)

(58) Field of Classification Search
CPC .. H10F 39/8067; H10F 39/18; H10F 39/8057; H10F 39/8063; H10F 39/811;
(Continued)

(56) References Cited

U.S. PATENT DOCUMENTS

2016/0276806 A1   9/2016  Ohira et al.
2017/0110493 A1   4/2017  Yokogawa
(Continued)

FOREIGN PATENT DOCUMENTS

CN      109906512 A      6/2019
JP      2010-118412      5/2010
(Continued)

OTHER PUBLICATIONS

International Search Report and Written Opinion prepared by the Japan Patent Office on Jul. 2, 2021, for International Application No. PCT/JP2021/014716, 3 pgs.

*Primary Examiner* — Brigitte A Paterson
(74) *Attorney, Agent, or Firm* — Sheridan Ross PC

(57) ABSTRACT

An imaging element is disclosed that includes: a semiconductor substrate; a multilayer wiring layer; a plurality of structures; and a light reflecting layer. The semiconductor substrate has a first surface as a light incidence surface and a second surface opposite to the first surface. A light receiving section of the semiconductor substrate generates electric charge through photoelectric conversion. The multilayer wiring layer has a plurality of wiring layers and is on the second surface side of the semiconductor substrate. The plurality of structures is in the multilayer wiring layer. The light reflecting layer is in the multilayer wiring layer, and forms a reflective region or a non-reflective region in a region with the interlayer insulating layer interposed in between. The region has none of the structures formed therein. The reflective region and the non-reflective region are substantially symmetrical with respect to the optical center of the pixel.

20 Claims, 31 Drawing Sheets

(58) Field of Classification Search
CPC .... H10F 39/199; H10F 39/813; H10F 39/802; H10F 39/803; H10F 39/8037; H04N 25/70; H04N 25/59; H04N 25/766; H04N 25/7795

See application file for complete search history.

(56) References Cited

U.S. PATENT DOCUMENTS

| | | | | |
|---|---|---|---|---|
| 2017/0229503 | A1* | 8/2017 | Suzuki | H10F 39/8057 |
| 2019/0081094 | A1* | 3/2019 | Kato | H10F 39/8063 |
| 2019/0229141 | A1* | 7/2019 | Kim | H10F 39/807 |
| 2019/0244992 | A1 | 8/2019 | Yokogawa et al. | |
| 2020/0006407 | A1 | 1/2020 | Yokogawa | |
| 2020/0194473 | A1 | 6/2020 | Yokogawa | |

FOREIGN PATENT DOCUMENTS

| | | |
|---|---|---|
| JP | 2014-053429 | 3/2014 |
| JP | 2016-001633 | 1/2016 |
| JP | 2016-178293 | 10/2016 |
| JP | 2020013909 A | 1/2020 |
| KR | 20190067179 A | 6/2019 |
| KR | 20200010040 A | 1/2020 |
| TW | 202006959 A | 2/2020 |
| WO | WO 2018/079296 | 5/2018 |
| WO | WO-2020012984 A1 | 1/2020 |

* cited by examiner

IMAGING ELEMENT AND IMAGING DEVICE

CROSS REFERENCE TO RELATED APPLICATIONS

This application is a national stage application under 35 U.S.C. 371 and claims the benefit of PCT Application No. PCT/JP2021/014716, having an international filing date of 7 Apr. 2021, which designated the United States, which PCT application claimed the benefit of Japanese Patent Application No. 2020-095062, filed 29 May 2020, the entire disclosures of each of which are incorporated herein by reference.

TECHNICAL FIELD

The present disclosure relates, for example, to a back-illuminated imaging element and an imaging device including the back-illuminated imaging element.

BACKGROUND ART

In a back-illuminated CMOS (Complementary Metal Oxide Semiconductor) image sensor (CIS), light that is not absorbed by a light receiving section, but passes through the light receiving section is sometimes reflected by a wiring layer (metal layer) provided below the light receiving section to enter the light receiving section again. In a case where these pieces of reflected light are not uniform in intensity in the respective pixels, optical color mixing occurs between adjacent pixels. To address this, for example, PTL 1 discloses a solid-state imaging device that achieves higher image quality by providing a first uniform reflecting plate to each of the pixels and periodically providing a second reflecting plate between adjacent pixels below a light receiving section.

CITATION LIST

Patent Literature

PTL 1: Japanese Unexamined Patent Application Publication No. 2014-53429

SUMMARY OF THE INVENTION

As described, an imaging device is requested to have higher image quality.

It is desirable to provide an imaging element and an imaging device that are each allowed to have higher image quality.

An imaging element according to an embodiment of the present disclosure includes: a semiconductor substrate; a multilayer wiring layer; a plurality of structures; and a light reflecting layer. The semiconductor substrate has a first surface and a second surface. The first surface serves as a light incidence surface. The second surface is opposite to the first surface. The semiconductor substrate includes a light receiving section for each of pixels. The light receiving section generates electric charge through photoelectric conversion. The electric charge corresponds to an amount of received light. The multilayer wiring layer is provided on the second surface side of the semiconductor substrate. The multilayer wiring layer has a plurality of wiring layers stacked therein with an interlayer insulating layer interposed in between. The plurality of structures is provided on the second surface of the semiconductor substrate in the multilayer wiring layer. The light reflecting layer is provided in the multilayer wiring layer. The light reflecting layer forms a reflective region or a non-reflective region in a region with the interlayer insulating layer interposed in between. The region has none of the structures formed therein. The reflective region is substantially symmetrical with respect to an optical center of the pixel. The non-reflective region is substantially symmetrical with respect to the optical center of the pixel.

An imaging device according to an embodiment of the present disclosure includes the imaging element according to the embodiment of the present disclosure described above.

The imaging element according to the embodiment of the present disclosure and the imaging device according to the embodiment are each provided with the light reflecting layer in the multilayer wiring layer provided on the second surface side opposite to the first surface serving as the light incidence surface of the first semiconductor substrate that includes the light receiving section for each of the pixels. The second surface includes the plurality of structures. This light reflecting layer forms the reflective region or the non-reflective region in the region with the interlayer insulating layer interposed in between. In the region, none of the structures are formed. The reflective region is substantially symmetrical with respect to the optical center of the pixel. The non-reflective region is substantially symmetrical with respect to the optical center of the pixel. Pieces of light reflected by the light reflecting layer to enter the light receiving section again are hereby made substantially uniform with respect to the angles of incidence.

MODES FOR CARRYING OUT THE INVENTION

The following describes an embodiment of the present disclosure in detail with reference to the drawings. The following description is a specific example of the present disclosure, but the present disclosure is not limited to the following modes. In addition, the present disclosure is not also limited to the disposition, dimensions, dimension ratios, and the like of the respective components illustrated in the respective diagrams. It is to be noted that description is given in the following order.

1. Embodiment (an example in which a light reflecting layer that is symmetrical with respect to an optical center is provided between a front surface of a semiconductor substrate and a plurality of wiring layers in a multilayer wiring layer)
1-1. Configuration of Imaging Element
1-2. Configuration of Imaging Device
1-3. Workings and Effects
2. Modification Examples
2-1. Modification Example 1 (an example in which a light reflecting layer is provided that has an opening which is symmetrical with respect to an optical center)
2-2. Modification Example 2 (Another Example of Shape of Light Reflecting Layer)
2-3. Modification Example 3 (Example of Formation Position of Light Reflecting Layer in Peripheral Portion)
2-4. Modification Example 4 (Another Example of Formation Position of Light Reflecting Layer)
2-5. Modification Example 5 (Another Example of Formation Position of Light Reflecting Layer)
2-6. Modification Example 6 (Example of Imaging Element Including Electric Charge Holding Section)
2-7. Modification Example 7 (Example of Imaging Element that Shares Readout Circuit between Adjacent Pixels)
2-8. Modification Example 8 (an example in which an uneven structure is provided on a front surface of a semiconductor substrate)
2-9. Modification Example 9 (an example in which a light reflection control layer is further provided on a light reflecting layer)
2-10. Modification Example 10 (Another Example of Light Reflection Control Layer)
2-11. Modification Example 11 (Another Example of Light Reflecting Layer)

3. Application Example
4. Practical Application Examples

1. EMBODIMENT

Figure 1:
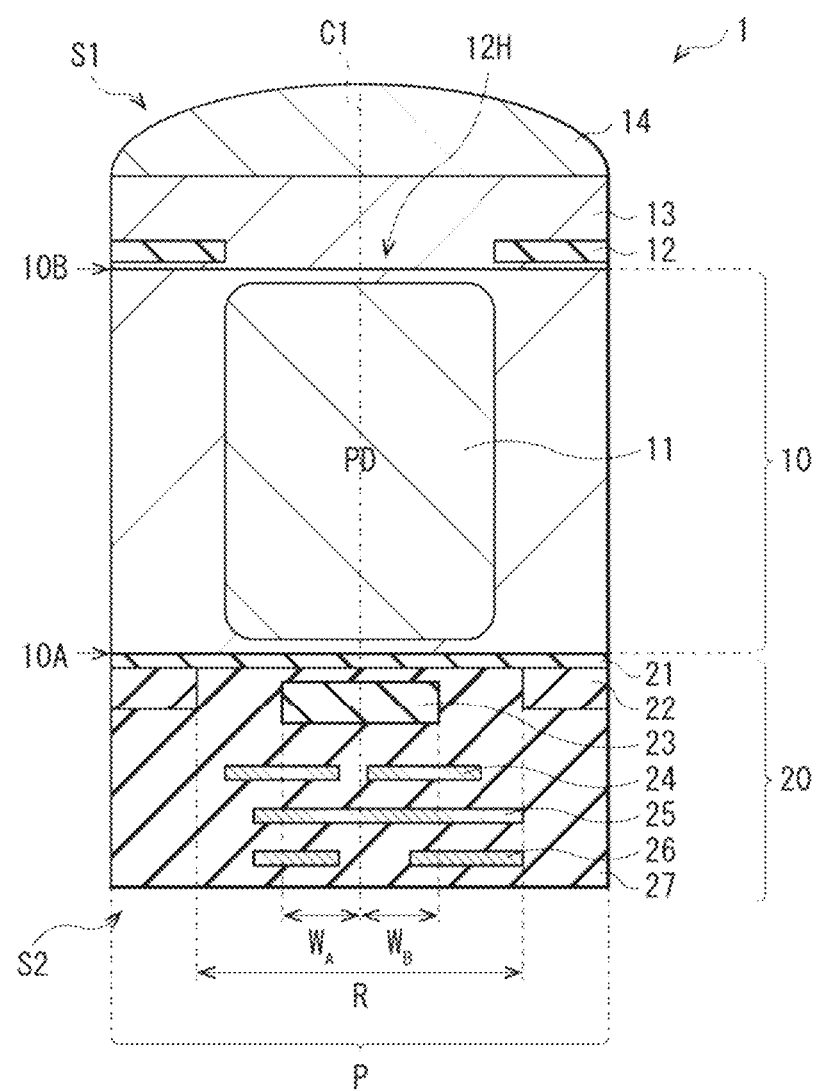
FIG. 1 is a cross-sectional schematic diagram illustrating an example of a schematic configuration of an imaging element according to an embodiment of the present disclosure.

FIG. 1 schematically illustrates an example of a cross-sectional configuration of an imaging element (imaging element 1) according to an embodiment of the present disclosure.

Figure 2:
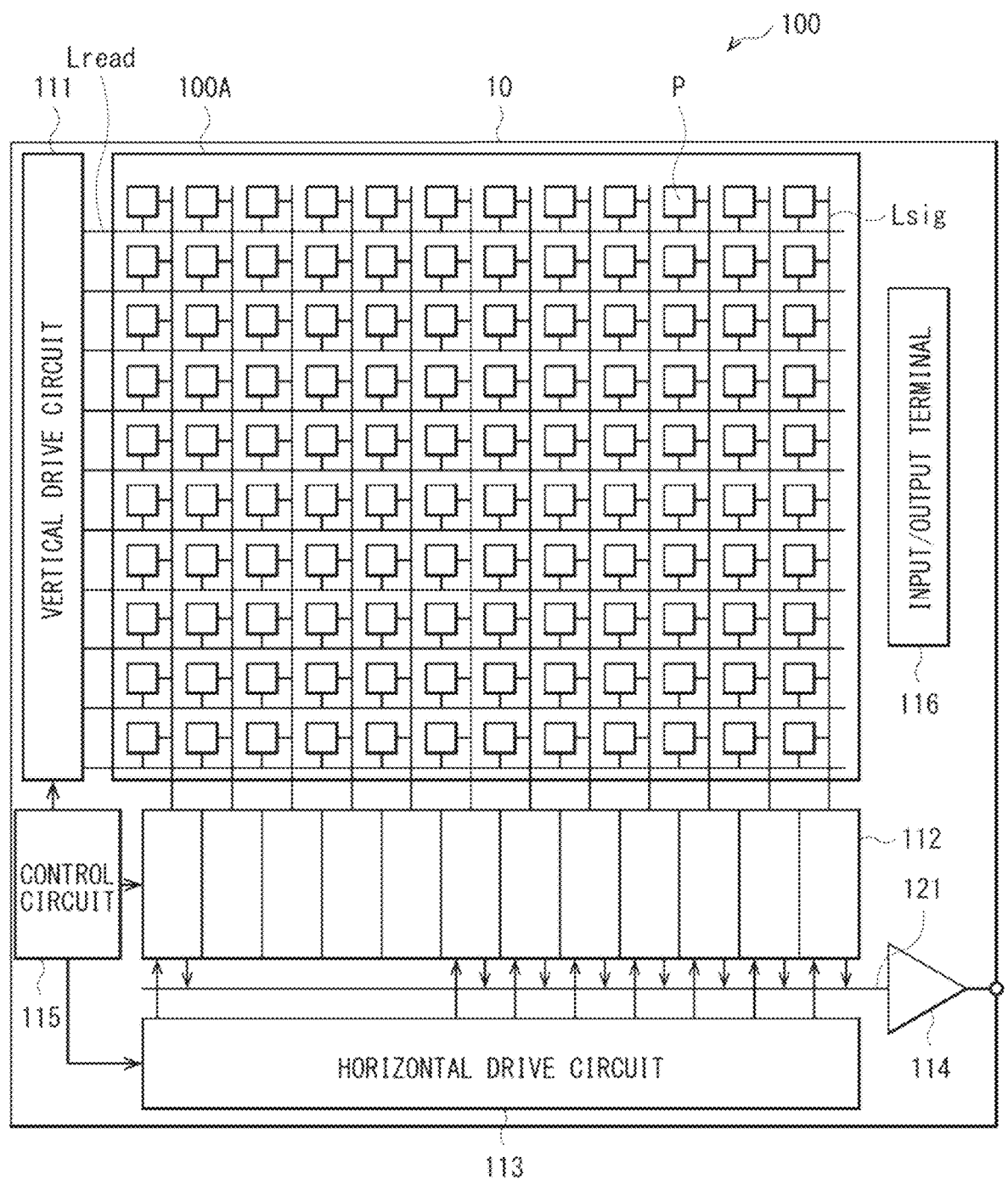
FIG. 2 is a block diagram illustrating an overall configuration of the imaging element illustrated in FIG. 1.

FIG. 2 illustrates an example of an overall configuration of an imaging device (imaging device 100) including the imaging element 1 illustrated in FIG. 1. The imaging device 100 is, for example, a CMOS image sensor or the like that is used for an electronic apparatus such as a digital still camera or a video camera. The imaging device 100 includes a pixel section 100A as an imaging area. In the pixel section 100A, a plurality of pixels is two-dimensionally disposed in a matrix. The imaging element 1 is a so-called back-illuminated imaging element included in one pixel (unit pixel P) in this CMOS image sensor or the like.

1-1. Configuration of Imaging Element

The imaging element 1 has a configuration in which a semiconductor substrate 10 and a multilayer wiring layer 20 are stacked. A light receiving section 11 is formed to be buried in the semiconductor substrate 10. The multilayer wiring layer 20 includes a plurality of wiring layers (e.g., wiring layers 24, 25, and 26). The semiconductor substrate 10 has a first surface (front surface) 10A and a second surface (back surface) 10B that are opposed to each other. The multilayer wiring layer 20 is provided on the first surface 10A side of the semiconductor substrate 10. The second surface 10B of the semiconductor substrate 10 serves as a light incidence surface. The imaging element 1 according to the present embodiment is provided with a light reflecting layer 23 between the first surface 10A of the semiconductor substrate 10 and the plurality of wiring layers (the wiring layers 24, 25, and 26) provided in the multilayer wiring layer 20. This light reflecting layer 23 forms a reflective region in a region R in the multilayer wiring layer 20 with an interlayer insulating layer 27 interposed in between. In the region R, none of the structures provided on the first surface 10A of the semiconductor substrate 10 are formed. The reflective region is substantially symmetrical with respect to an optical center C1 of the unit pixel P.

This semiconductor substrate 10 corresponds to a specific example of a "semiconductor substrate" according to the present disclosure. The first surface 10A of the semiconductor substrate 10 corresponds to a specific example of a "second surface" according to the present disclosure and the second surface 10B of the semiconductor substrate 10 corresponds to a specific example of a "first surface" according to the present disclosure. The light reflecting layer 23 corresponds to a specific example of a "light reflecting layer" according to the present disclosure.

The semiconductor substrate 10 includes, for example, a silicon substrate. As described above, the light receiving section 11 is formed to be buried in the semiconductor substrate 10, for example, for each of the unit pixels P. This light receiving section 11 is, for example, PIN (Positive Intrinsic Negative) type photodiode PD and has a pn junction in a predetermined region of the semiconductor substrate 10.

The first surface 10A of the semiconductor substrate 10 is provided with a floating diffusion FD and a pixel circuit that outputs a pixel signal based on electric charge outputted from the light receiving section 11. The pixel circuit includes, for example, a transfer transistor TR, an amplification transistor AMP, a reset transistor RST, and a selection transistor SEL as pixel transistors. These floating diffusion FD, transfer transistor TR, amplification transistor AMP, reset transistor RST, and selection transistor SEL each correspond to a specific example of a "structure" according to the present disclosure.

Figure 3:
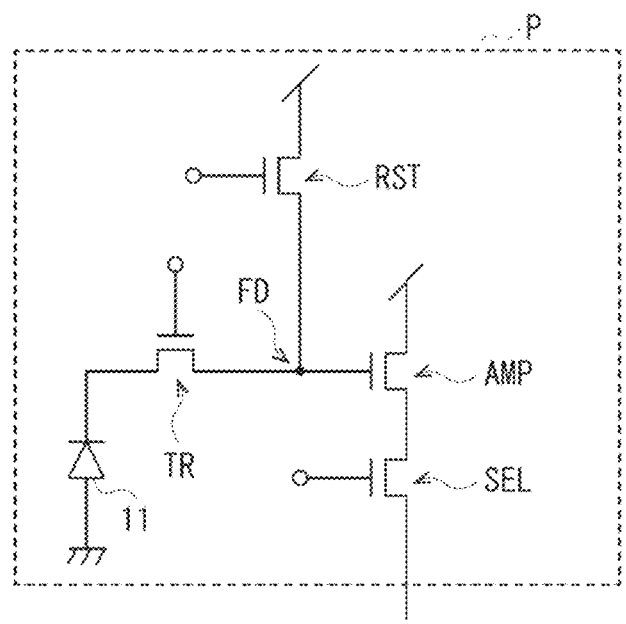
FIG. 3 is an equivalent circuit diagram of the imaging element illustrated in FIG. 1.

FIG. 3 illustrates an example of a pixel circuit of the imaging element 1 illustrated in FIG. 1.

The transfer transistor TR is coupled between the light receiving section 11 and the floating diffusion FD. A drive signal TGsig is applied to the gate electrode of the transfer transistor TR. In a case where this drive signal TGsig enters the active state, the transfer gate of the transfer transistor TR enters the conduction state and the signal charge accumulated in the light receiving section 11 is transferred to the floating diffusion FD through the transfer transistor TR.

The floating diffusion FD is coupled between the transfer transistor TR and the amplification transistor AMP. The floating diffusion FD performs electric charge voltage conversion to convert the signal charge transferred by the transfer transistor TR into a voltage signal and makes an output to the amplification transistor AMP.

The reset transistor RST is coupled between the floating diffusion FD and a power supply section. A drive signal RSTsig is applied to the gate electrode of the reset transistor RST. In a case where this drive signal RSTsig enters the active state, the reset gate of the reset transistor RST enters the conduction state and the potential of the floating diffusion FD is reset to the level of the power supply section.

The gate electrode of the amplification transistor AMP is coupled to the floating diffusion FD and the drain electrode thereof is coupled to the power supply section. The amplification transistor AMP serves as an input section of a readout circuit of a voltage signal held in the floating diffusion FD. In other words, the amplification transistor AMP serves as an input section of a so-called source follower circuit. In other words, the source electrode of the amplification transistor AMP is coupled to a vertical signal line Lsig through the selection transistor SEL. This configures the source follower circuit along with a constant current source that is coupled to one end of the vertical signal line Lsig.

The selection transistor SEL is coupled between the source electrode of the amplification transistor AMP and the vertical signal line Lsig. A drive signal SELsig is applied to the gate electrode of the selection transistor SEL. In a case where this drive signal SELsig enters the active state, the selection transistor SEL enters the conduction state and the unit pixel P enters the selected state. This causes a readout signal (pixel signal) outputted from the amplification transistor AMP to be outputted to the vertical signal line Lsig through the selection transistor SEL.

As described above, the multilayer wiring layer 20 is provided on the first surface 10A side of the semiconductor substrate 10. The multilayer wiring layer 20 includes, for example, an insulating layer 21, a gate wiring layer 22, and the interlayer insulating layer 27 in which the light reflecting layer 23 and the plurality of wiring layers 24, 25, and 26 described above are provided.

The insulating layer 21 is provided, for example, on the first surface 10A of the semiconductor substrate 10, for example, as the gate insulating layer of a pixel transistor. Examples of a material of the insulating layer 21 include silicon oxide ($SiO_x$), silicon nitride ($SiN_x$), silicon oxynitride ($SiO_xN_y$), and the like.

The gate wiring layer 22 is provided, for example, with the gate electrodes of the transfer transistor TR, the amplification transistor AMP, the reset transistor RST, and the selection transistor SEL described above. The gate wiring layer 22 is formed by using, for example, polysilicon (Poly-Si).

The light reflecting layer 23 reflects light that has not been absorbed by the light receiving section 11, but has passed through the semiconductor substrate 10 and has entered the multilayer wiring layer 20 and causes the light to enter the semiconductor substrate 10 again. The light reflecting layer 23 is provided between the first surface 10A of the semiconductor substrate 10 and the wiring layer 24, for example, in the interlayer insulating layer 27. The light reflecting layer 23 forms a reflective region in the region R with only the insulating layer 21 and the interlayer insulating layer 27 interposed in between, for example, for each of the unit pixels P. In the region R, the gate electrodes of the pixel transistors described above are not provided. The reflective region is substantially symmetrical with respect to the optical center C1 of the unit pixel P. Here, the wording "substantially symmetrical" refers, for example, to the substantial equality ($W_A \approx W_B$) between left and right widths $W_A$ and $W_B$ with respect to the optical center C1. The optical center C1 is an axis passing through the lens center of an on-chip lens 14 and the center of an opening 12H of a light shielding film 12. The on-chip lens 14 and the light shielding film 12 are described below.

It is possible to form the light reflecting layer 23 by using a material having light reflectivity. Examples of the material having light reflectivity include metal materials including tungsten (W), aluminum (Al), copper (Cu), and the like. In addition, it is also possible to form the light reflecting layer 23 by using, for example, a so-called dielectric multilayer film in which layers each including an inorganic material having a high refractive index and layers each including an inorganic material having a low refractive index are alternately stacked. Examples of the inorganic material having a high refractive index include titanium oxide ($TiO_x$) and hafnium oxide ($HfO_x$). Examples of the inorganic material having a low refractive index include silicon oxide ($SiO_x$) and magnesium fluoride ($MgF_x$).

The wiring layers 24, 25, and 26 are, for example, for driving the light receiving section 11, transmitting signals, applying voltages to the respective sections, and the like. The wiring layers 24, 25, and 26 are formed to be stacked in the interlayer insulating layer 27 in the order of the wiring layers 24, 25, and 26 from the semiconductor substrate 10 side with the interlayer insulating layers 27 interposed in between. Each of the wiring layers 24, 25, and 26 is formed by using, for example, copper (Cu) or aluminum (Al).

The interlayer insulating layer 27 is provided on the insulating layer 21 to cover the gate wiring layer 22. As described above, the interlayer insulating layer 27 includes the light reflecting layer 23 and the wiring layers 24, 25, and 26 therein. The interlayer insulating layer 27 is formed by using, for example, silicon oxide ($SiO_x$), silicon nitride ($SiN_x$), silicon oxynitride ($SiO_xN_y$), and the like as with the insulating layer 21.

For example, the light shielding film 12, a protective layer 13, and the on-chip lens 14 are provided on the second surface 10B side of the semiconductor substrate 10.

The light shielding film 12 is for preventing oblique light coming from a light incidence side S1 from entering the adjacent unit pixel P. The light shielding film 12 is provided, for example, between the adjacent unit pixels P. The light shielding film 12 has the opening 12H in the middle of the unit pixels P. The light shielding film 12 is formed by using, for example, a metal film of tungsten (W) or the like.

The protective layer 13 includes, for example, the light shielding film 12 therein. The protective layer 13 is for protecting the second surface 10B of the semiconductor substrate 10 and planarizing the surface on the light incidence side S1. The protective layer 13 is formed by using, for example, silicon oxide ($SiO_x$), silicon nitride ($SiN_x$), silicon oxynitride ($SiO_xN_y$), and the like.

The on-chip lens 14 is for condensing light coming from the light incidence side S1 on the light receiving section 11. The on-chip lens 14 is formed by using a high refractive index material. Specifically, the on-chip lens 14 is formed by using, for example, an inorganic material such as silicon oxide ($SiO_x$) or silicon nitride ($SiN_x$). In addition, an organic material may be used that has a high refractive index such as an episulfide-based resin or a thietane compound or a resin thereof. The shape of the on-chip lens 14 is not particularly limited, but it is possible to use a variety of lens shapes including a hemispherical shape, a semicylindrical shape, and the like. As illustrated in FIG. 1, the on-chip lens 14 may be provided for each of the unit pixels P. Alternatively, for example, the plurality of unit pixels P may be provided with one on-chip lens.

1-2. Configuration of Imaging Device

The imaging device 100 is, for example, a CMOS image sensor. The imaging device 100 takes in incident light (image light) from a subject through an optical lens system (not illustrated). The imaging device 100 converts the amount of incident light formed on the imaging surface as an image into electric signals in units of pixels and outputs the electric signals as pixel signals. The imaging device 100 includes the pixel section 100A serving as an imaging area on the semiconductor substrate 10. In addition, the imaging device 100 includes, for example, a vertical drive circuit 111, a column signal processing circuit 112, a horizontal drive circuit 113, an output circuit 114, a control circuit 115, and an input/output terminal 116 in a peripheral region of this pixel section 100A.

The pixel section 100A includes, for example, the plurality of unit pixels P that is two-dimensionally disposed in a matrix. These unit pixels P are provided, for example, with a pixel drive line Lread (specifically, a row selection line and a reset control line) for each of the pixel rows and provided with the vertical signal line Lsig for each of the pixel columns. The pixel drive line Lread is for transmitting drive signals for reading out signals from the pixels. One end of the pixel drive line Lread is coupled to the output end of the vertical drive circuit 111 corresponding to each of the rows.

The vertical drive circuit 111 includes a shift register, an address decoder, and the like. The vertical drive circuit 111 is a pixel driver that drives the respective unit pixels P of the pixel section 100A, for example, in units of rows. Signals outputted from the respective unit pixels P in the pixel rows selectively scanned by the vertical drive circuit 111 are supplied to the column signal processing circuits 112 through the respective vertical signal lines Lsig. Each of the column signal processing circuits 112 includes an amplifier, a horizontal selection switch, and the like that are provided for each of the vertical signal lines Lsig.

The horizontal drive circuit 113 includes a shift register, an address decoder, and the like. The horizontal drive circuit 113 drives the respective horizontal selection switches of the column signal processing circuits 112 in order while scanning the horizontal selection switches. This selective scanning by the horizontal drive circuit 113 outputs the signals of the respective pixels transmitted through the respective vertical signal lines Lsig to a horizontal signal line 121 in order and transmits the signals to the outside of the semiconductor substrate 10 through the horizontal signal line 121.

The output circuit 114 performs signal processing on the signals sequentially supplied from the respective column signal processing circuits 112 through the horizontal signal line 121 and outputs the signals. The output circuit 114 performs, for example, only buffering in some cases and performs black level adjustment, column variation correction, various kinds of digital signal processing, and the like in other cases.

The circuit portions including the vertical drive circuit 111, the column signal processing circuit 112, the horizontal drive circuit 113, the horizontal signal line 121, and the output circuit 114 may be formed directly on the semiconductor substrate 10 or may be provided in external control IC. In addition, those circuit portions may be formed in another substrate coupled by a cable or the like.

The control circuit 115 receives a clock supplied from the outside of the semiconductor substrate 10, data for an instruction about an operation mode, and the like and also outputs data such as internal information of the imaging device 100. The control circuit 115 further includes a timing generator that generates a variety of timing signals and controls the driving of peripheral circuits such as the vertical drive circuit 111, the column signal processing circuit 112, and the horizontal drive circuit 113 on the basis of the variety of timing signals generated by the timing generator.

The input/output terminal 116 exchanges signals with the outside.

1-3. Workings and Effects

In the imaging element 1 according to the present embodiment, the light reflecting layer 23 is provided in the region R in the multilayer wiring layer 20 provided on the first surface 10A side of the semiconductor substrate 10 opposite to the light incidence side S1. In the region R, the gate electrodes of the pixel transistors or the like provided on the first surface 10A of the semiconductor substrate 10 are not formed. This light reflecting layer 23 forms a reflective region with the insulating layer 21 and the interlayer insulating layer 27 interposed in between. The reflective region is substantially symmetrical with respect to the optical center C1 of the unit pixel P. Pieces of light passing through the semiconductor substrate 10 and reflected by the light reflecting layer 23 to enter the light receiving section 11 again are hereby made substantially uniform with respect to the angles of incidence. The following describes this.

Back-illuminated CIS does not photoelectrically converts all pieces of light coming from the light incidence surface in the light receiving section. A portion of the pieces of light passes through the semiconductor substrate and enters the multilayer wiring layer provided on the opposite side of the semiconductor substrate to the light incidence surface. In that case, the presence of a reflector ahead the light entering the multilayer wiring layer causes the light to be reflected toward the light receiving section again. This is expected to increase the sensitivity and suppress color mixing.

However, in a case where the reflector is formed in an unbalanced manner with respect to the optical center in a region in which the reflector is opposed to the semiconductor substrate or a region in which there is no structure such as the gate wiring line of a pixel transistor or an element separation section between the opposite surface of the semiconductor substrate to the light incidence surface and the reflector, light reflected by the reflector also has asymmetry with respect to the optical center. In a case where light having asymmetry enters the light receiving section again in this way, a great sensitivity variation occurs in the incidence direction of the light and the image quality may decrease.

In contrast, in the present embodiment, the light reflecting layer 23 is provided in the region R in the multilayer wiring layer 20 provided on the first surface 10A side of the semiconductor substrate 10 opposite to the light incidence side S1. In the region R, the gate electrodes of the pixel transistors or the like provided on the first surface 10A of the semiconductor substrate 10 are not formed. This light reflecting layer 23 forms a reflective region that is substantially symmetrical with respect to the optical center C1 of the unit pixel P. The light reflecting layer 23 has a layout in which the light reflecting layer 23 has symmetry with respect to the optical center C1. Pieces of light reflected by the light reflecting layer 23 to enter the light receiving section 11 again are hereby made substantially uniform with respect to the angles of incidence.

As described above, the imaging element 1 according to the present embodiment is provided with the light reflecting layer 23 in the region R in the multilayer wiring layer 20. In the region R, none of the structures such as a gate electrode (gate wiring layer 22) included in a pixel transistor are not formed. The light reflecting layer 23 forms a reflective region with the interlayer insulating layer 27 interposed in between. The reflective region is substantially symmetrical with respect to the optical center C1 of the unit pixel P. Pieces of light that are not absorbed by the light receiving section 11, but enter the multilayer wiring layer 20 and are reflected by the light reflecting layer 23 to enter the light receiving section 11 again are thus made substantially uniform with respect to the angles of incidence. This improves sensitivity variations in the respective unit pixels P. The shading shape has a peak in the middle of the field angle. This makes it possible to increase the image quality.

It is to be noted that the example has been described in the present embodiment in which a reflective region that is substantially symmetrical with respect to the optical center C1 of the unit pixel P is formed by providing the light reflecting layer 23 between the first surface 10A of the semiconductor substrate 10 and the plurality of wiring layers 24 formed in the multilayer wiring layer 20, but this reflective region may be formed by any of the wiring layer 24, 25, or 26 formed to be stacked with the interlayer insulating layer 27 interposed in between.

Figure 4A:
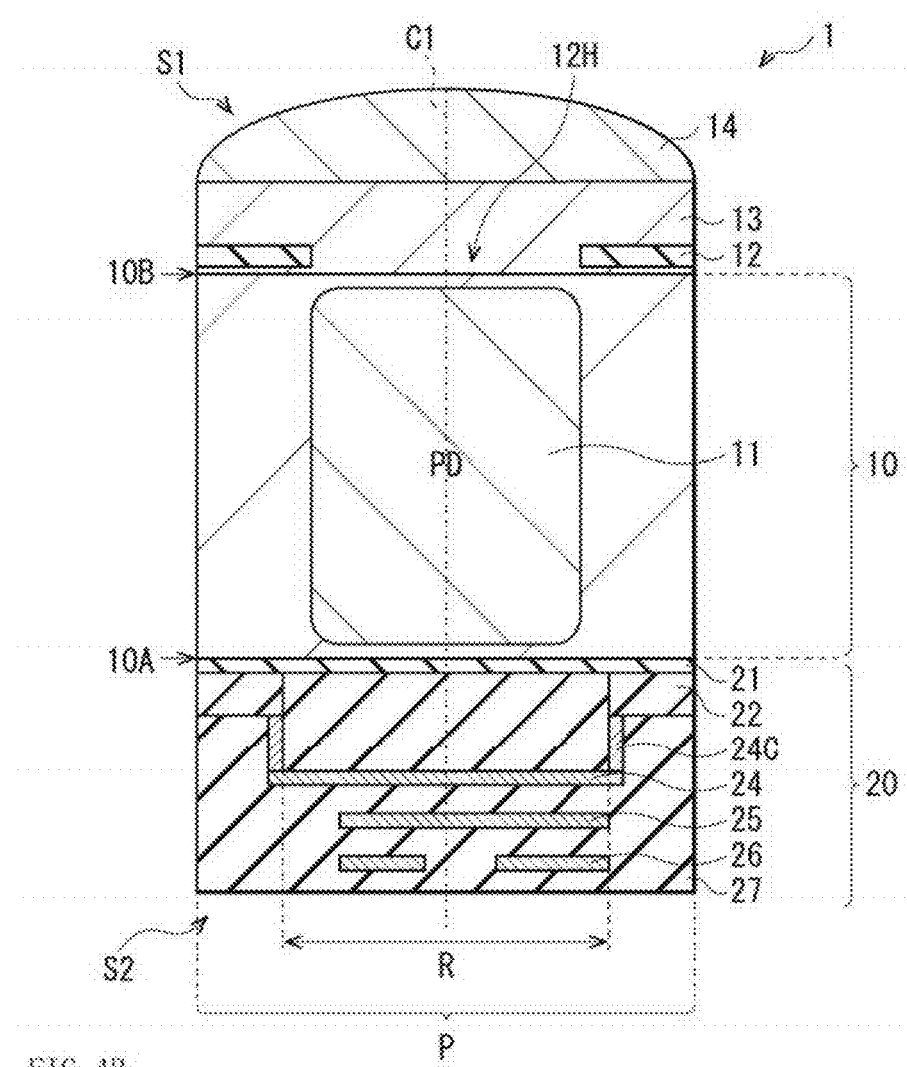
FIG. 4A is a cross-sectional schematic diagram illustrating another example of the schematic configuration of the imaging element according to the embodiment of the present disclosure.
Figure 4B:
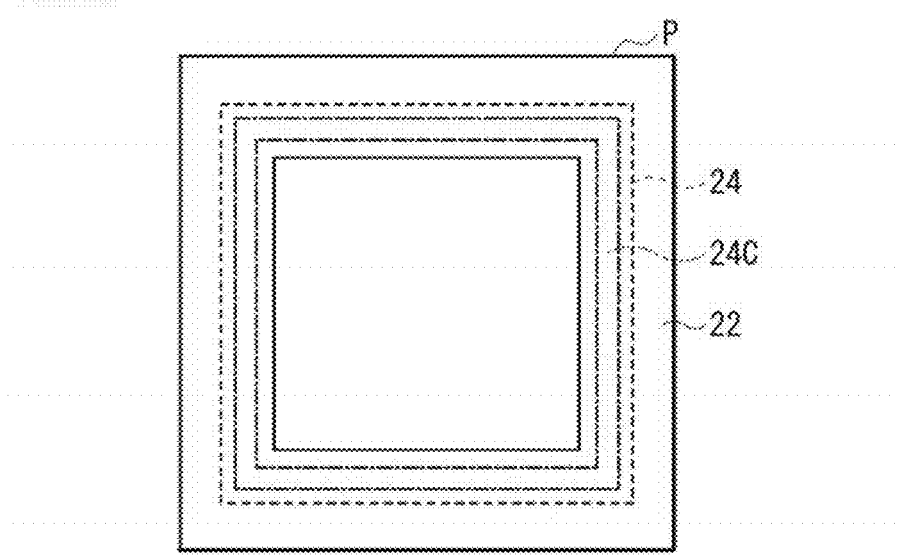
FIG. 4B is a schematic diagram illustrating a planar configuration of the imaging element illustrated in FIG. 4A.

Specifically, for example, as illustrated in FIG. 4A, in a case where, for example, the wiring layer 24 is formed in the region R to be substantially symmetrical with respect to the optical center C1 of the unit pixel P, it is possible to use this wiring layer 24 as a light reflecting layer. In the region R, none of the structures such as a gate electrode included in a pixel transistor are formed. In that case, as illustrated in FIG. 4A, a contact 24C may be formed that couples the gate wiring layer 22 and the wiring layer 24 serving as a light reflecting layer. As illustrated in FIG. 4B, this contact 24C is provided in an annular shape to surround the region R. This confines light passing through the light receiving section 11 in the own pixel. This makes it possible to increase the sensitivity and suppress the occurrence of color mixing in the adjacent unit pixel P.

Next, modification examples 1 to 11 of the present disclosure are described. The following assigns the same signs to components similar to those of the embodiment described above and omits descriptions thereof as appropriate.

2. Modification Examples

2-1. Modification Example 1

Figure 5:
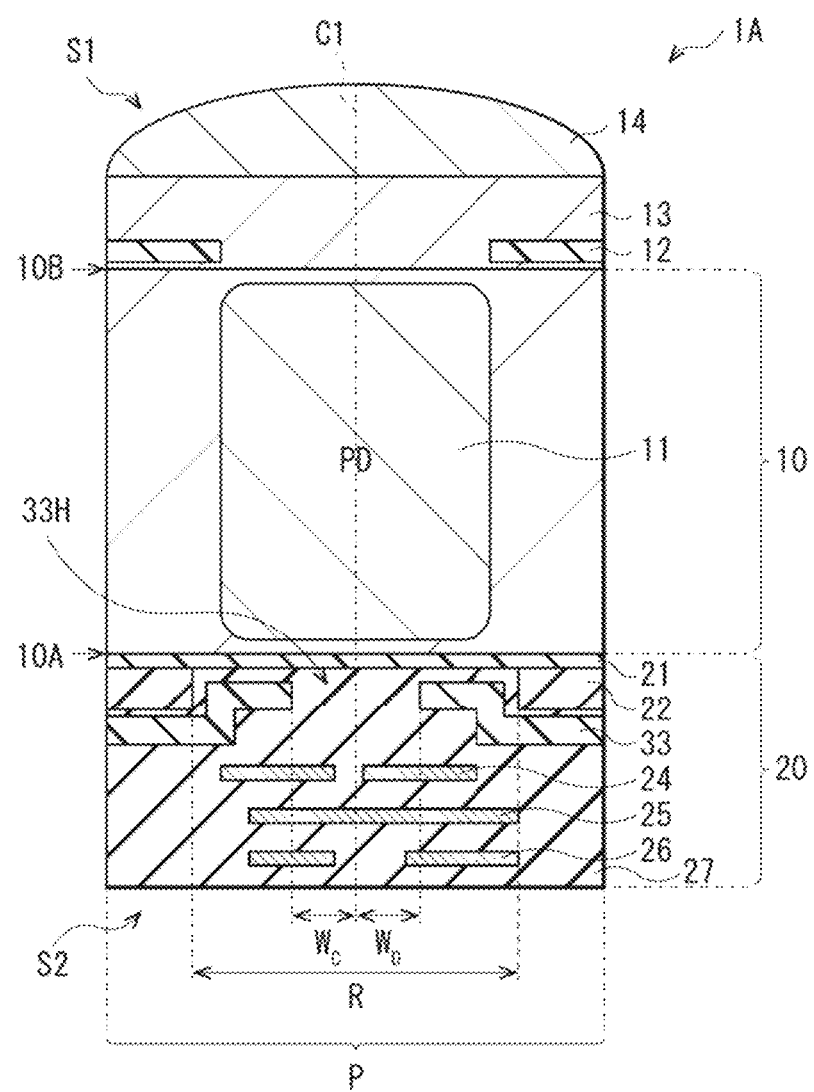
FIG. 5 is a cross-sectional schematic diagram illustrating an example of a schematic configuration of an imaging element according to a modification example 1 of the present disclosure.

FIG. 5 schematically illustrates an example of a cross-sectional configuration of an imaging element (imaging element 1A) according to the modification example 1 of the present disclosure. In the embodiment described above, the example has been described in which the light reflecting layer 23 is provided that forms a reflective region which is substantially symmetrical with respect to the optical center C1 of the unit pixel P, but the shape of the light reflecting layer 23 is not limited to this. For example, the present modification example is different from the embodiment described above in that there is provided a light reflecting layer 33 that forms a non-reflective region which is substantially symmetrical with respect to the optical center C1 of the unit pixel P.

The light reflecting layer 33 is provided, for example, over the whole unit pixel P. The light reflecting layer 33 has an opening 33H that is substantially symmetrical with respect to the optical center C1 of the unit pixel P. This opening 33H forms a non-reflective region that is substantially symmetrical with respect to the optical center C1. Specifically, as illustrated in FIG. 5, none of the structures are formed including the floating diffusion FD, the transfer transistor TR, the amplification transistor AMP, the reset transistor RST, the selection transistor SEL, and the like in the region R and the light reflecting layer 33 extends, for example, down the gate electrodes of the pixel transistors described above from the region R. Here, the wording "substantially symmetrical" refers, for example, to the substantial equality ($W_C \approx W_D$) between left and right widths $W_C$ and $W_D$ of the opening 33H with respect to the optical center C1.

In this way, in the present modification, the light reflecting layer 33 is provided over the whole unit pixel P and has the opening 33H that is substantially symmetrical with respect to the optical center C1 of the unit pixel P. A non-reflective region is thus formed in the region R in which none of the structures are formed. The non-reflective region is substantially symmetrical with respect to the optical center C1. Pieces of light that are not absorbed by the light receiving section 11, but enter the multilayer wiring layer 20 and are reflected by the light reflecting layer 23 to enter the light receiving section 11 again are hereby made substantially uniform with respect to the angles of incidence. This improves sensitivity variations in the respective unit pixels P. The shading shape has a peak in the middle of the field angle. This makes it possible to increase the image quality.

2-2. Modification Example 2

Figure 6:
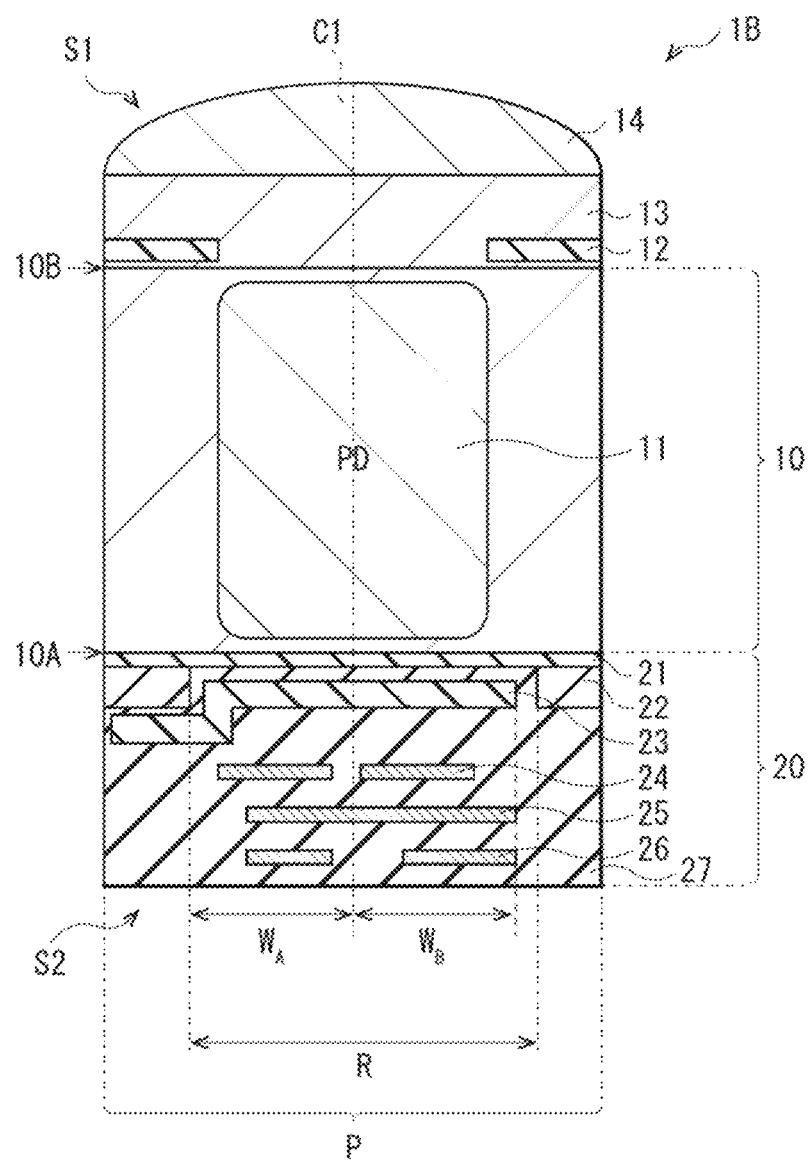
FIG. 6 is a cross-sectional schematic diagram illustrating an example of a schematic configuration of an imaging element according to a modification example 2 of the present disclosure.

FIG. 6 schematically illustrates an example of a cross-sectional configuration of an imaging element (imaging element 1B) according to the modification example 2 of the present disclosure. In the embodiment described above, the example has been described in which the light reflecting layer 23 is provided only in the region R in which none of the structure are formed, but this is not limitative. For example, as described in the embodiment described above, it is sufficient if the light reflecting layer 23 forms a reflective region with the interlayer insulating layer 27 interposed in between. The reflective region is substantially symmetrical with the optical center C1 of the unit pixel P. As long as the left and right widths $W_A$ and $W_B$ with respect to the optical center C1 satisfy $W_A \approx W_B$, a portion of the light reflecting layer 23 may extend down the gate wiring layer 22, for example, as illustrated in FIG. 6.

2-3. Modification Example 3

Figure 7:
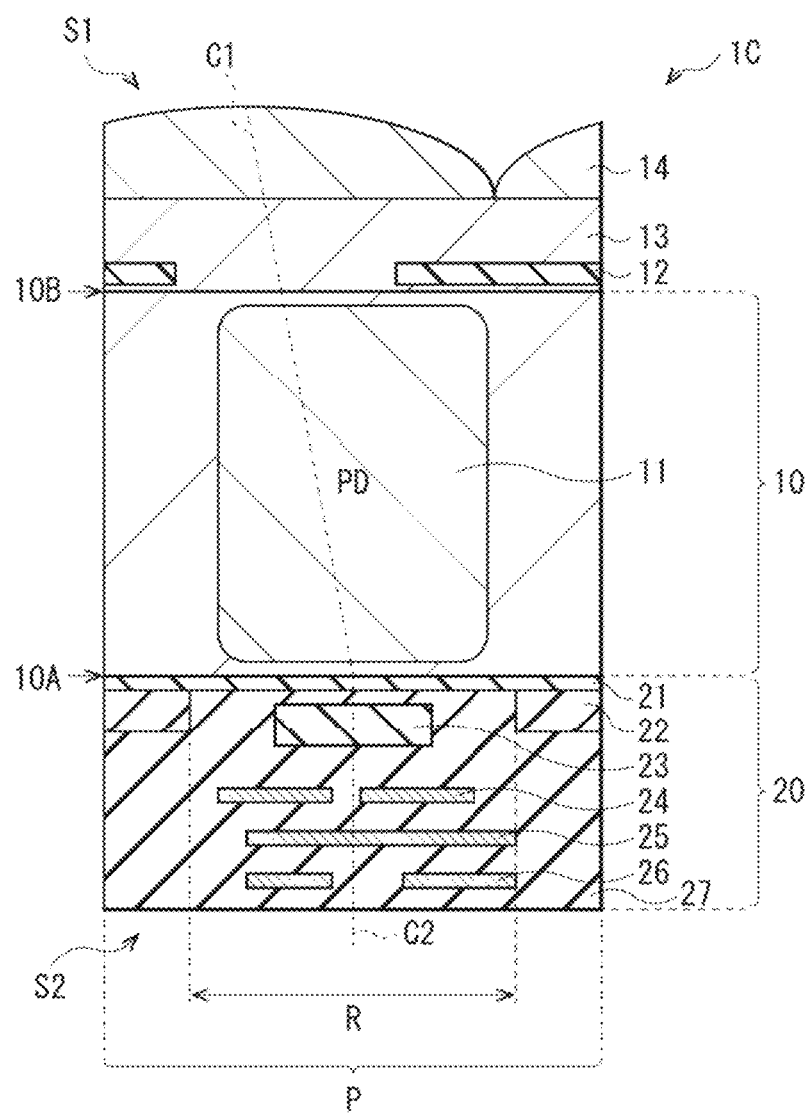
FIG. 7 is a cross-sectional schematic diagram illustrating an example of a schematic configuration of an imaging element according to a modification example 3 of the present disclosure.

FIG. 7 schematically illustrates an example of a cross-sectional configuration of an imaging element (imaging element 1C) according to the modification example 3 of the present disclosure. The imaging element 1C is included in the unit pixel P near the peripheral portion of the pixel section 100A to which pupil correction is applied, for example, in the imaging device 100 illustrated in FIG. 2.

In a case where pupil correction is applied to the unit pixel P near the peripheral portion of the pixel section 100A, the lens center of the on-chip lens 14 and the center of the opening 12H of the light shielding film 12 are formed at positions shifted in a predetermined direction (e.g., the middle direction of the pixel section 100A).

Figure 8:
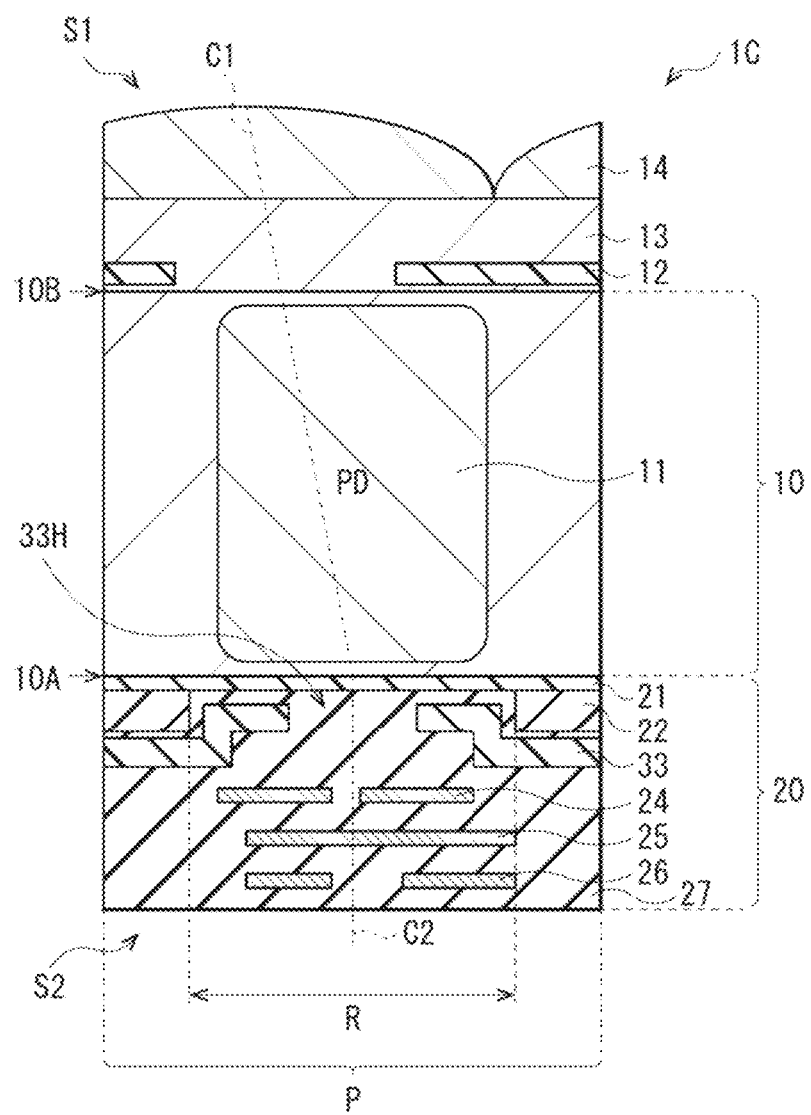
FIG. 8 is a cross-sectional schematic diagram illustrating another example of the schematic configuration of the imaging element according to the modification example 3 of the present disclosure.

In that case, it is preferable to form the light reflecting layer 23 to shift the light reflecting layer 23 in the opposite direction to the shift direction of the opening 12H of the light shielding film 12 in accordance with the amount of pupil correction applied above, for example, as illustrated in FIG. 7. Alternatively, for example, as illustrated in FIG. 8, the light reflecting layer 33 may be provided that has the opening 33H in the opposite direction to the shift direction of the opening 12H of the light shielding film 12 in accordance with the amount of pupil correction applied above as in the modification example 1 described above. This reduces sensitivity variations in the unit pixels P provided near the peripheral portion. The sensitivity variations are brought about by the application of pupil correction. This makes it possible to increase the image quality.

2-4. Modification Example 4

Figure 9:
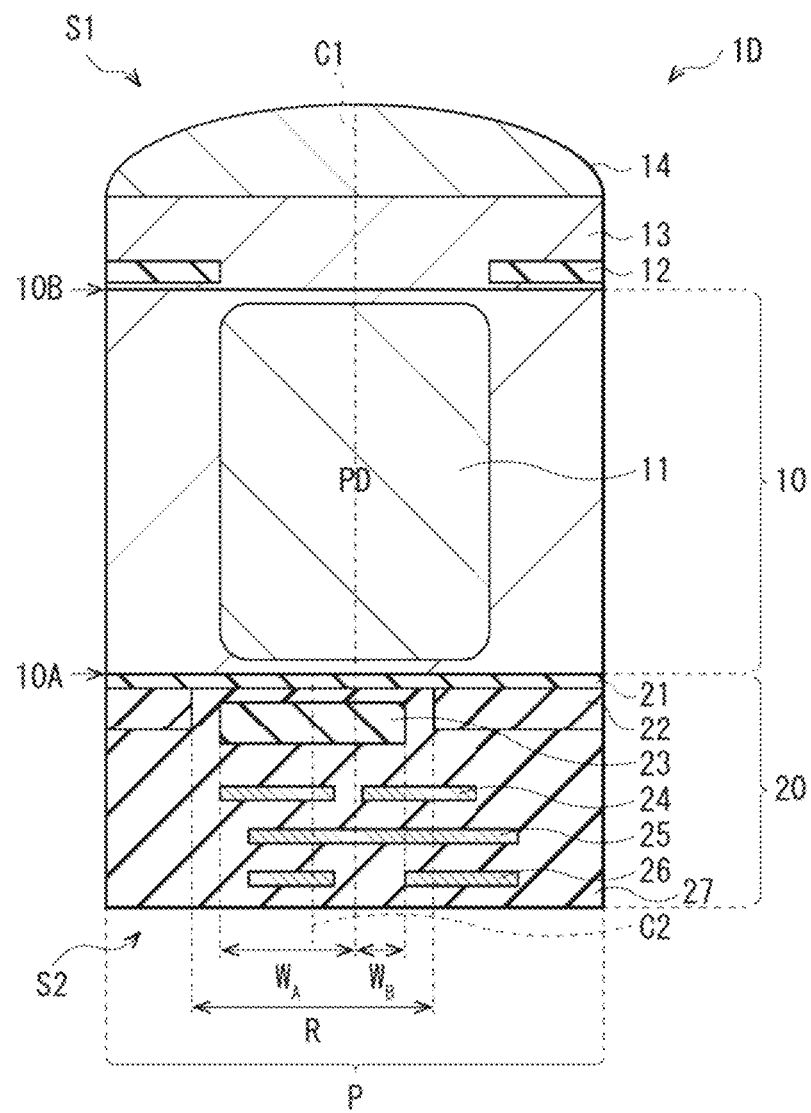
FIG. 9 is a cross-sectional schematic diagram illustrating an example of a schematic configuration of an imaging element according to a modification example 4 of the present disclosure.

FIG. 9 schematically illustrates an example of a cross-sectional configuration of an imaging element (imaging element 1D) according to the modification example 4 of the present disclosure. In the embodiment or the like described above, the example has been described in which a structure (gate wiring layer 22) provided on the first surface 10A of the semiconductor substrate 10 is formed to be symmetrical with respect to the optical center C1. However, in a case where the two adjacent unit pixels P share one pixel transistor, for example, as in the modification example 7 described below, the optical center C1 and a center C2 of the region R do not sometimes match each other. In the region R, none of the structures are formed on the first surface 10A of the semiconductor substrate 10.

Figure 10:
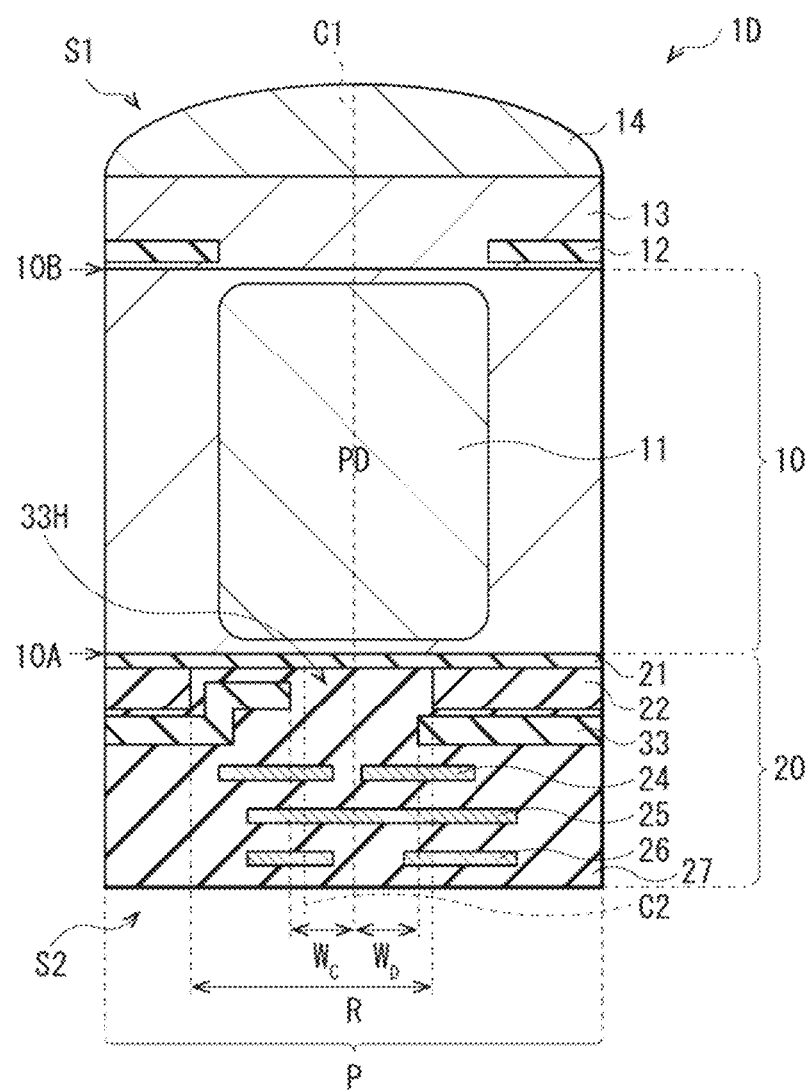
FIG. 10 is a cross-sectional schematic diagram illustrating another example of the schematic configuration of the imaging element according to the modification example 4 of the present disclosure.

In that case, a region in which the sensitivity may decrease is covered with the light reflecting layer 23. This makes it possible to adjust the sensitivity balance. Specifically, for example, as illustrated in FIG. 9, the light reflecting layer 23 may be provided to cause, for example, the left and right widths $W_A$ and $W_B$ with respect to the optical center C1 to satisfy $W_A > W_B$. Alternatively, for example, as illustrated in FIG. 10, the light reflecting layer 33 may be provided to cause, for example, the left and right widths $W_C$ and $W_D$ of the opening 33H with respect to the optical center C1 to satisfy $W_C < W_D$. This reduces sensitivity variations in the unit pixels P. This makes it possible to increase the image quality.

2-5. Modification Example 5

Figure 11:
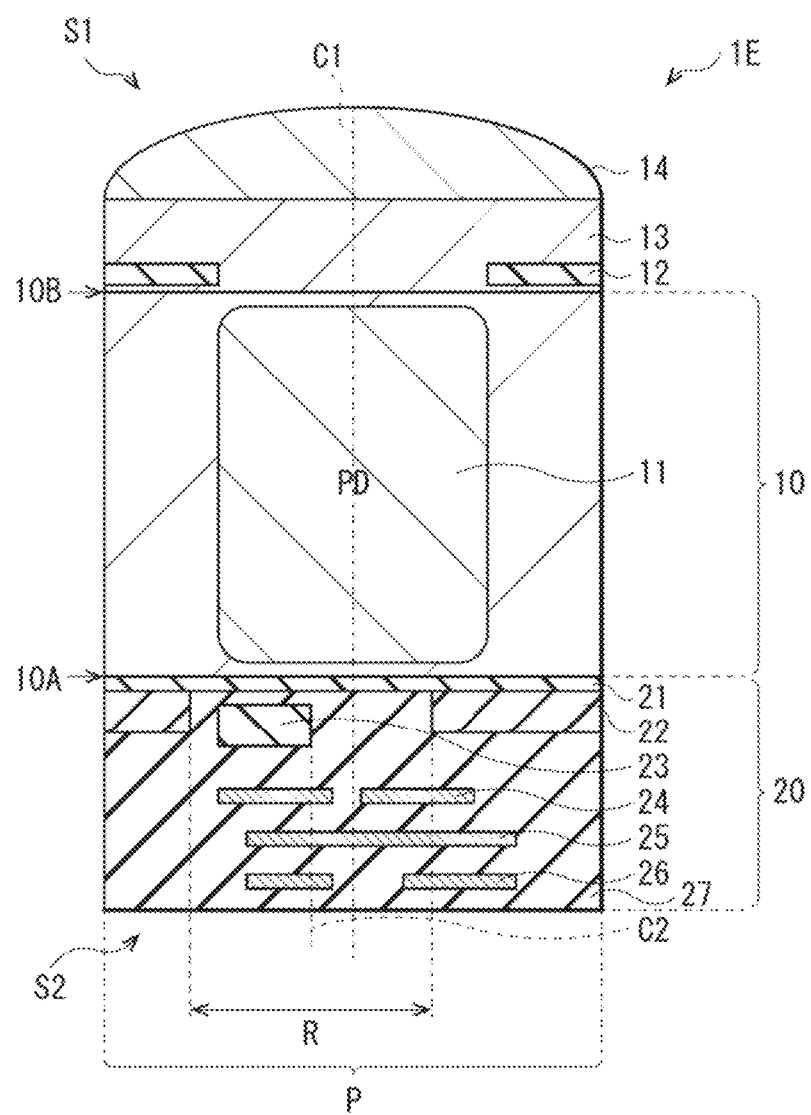
FIG. 11 is a cross-sectional schematic diagram illustrating an example of a schematic configuration of an imaging element according to a modification example 5 of the present disclosure.

FIG. 11 schematically illustrates an example of a cross-sectional configuration of an imaging element (imaging element 1E) according to the modification example 5 of the present disclosure. In a case where the sensitivity varies on the left and right of the optical center C1, for example, as in the modification example 4 described above, the light reflecting layer 23 may be selectively formed in a region having lower sensitivity as illustrated in FIG. 11. This hereby reduces sensitivity variations in the unit pixels P. This makes it possible to increase the image quality.

2-6. Modification Example 6

Figure 12:
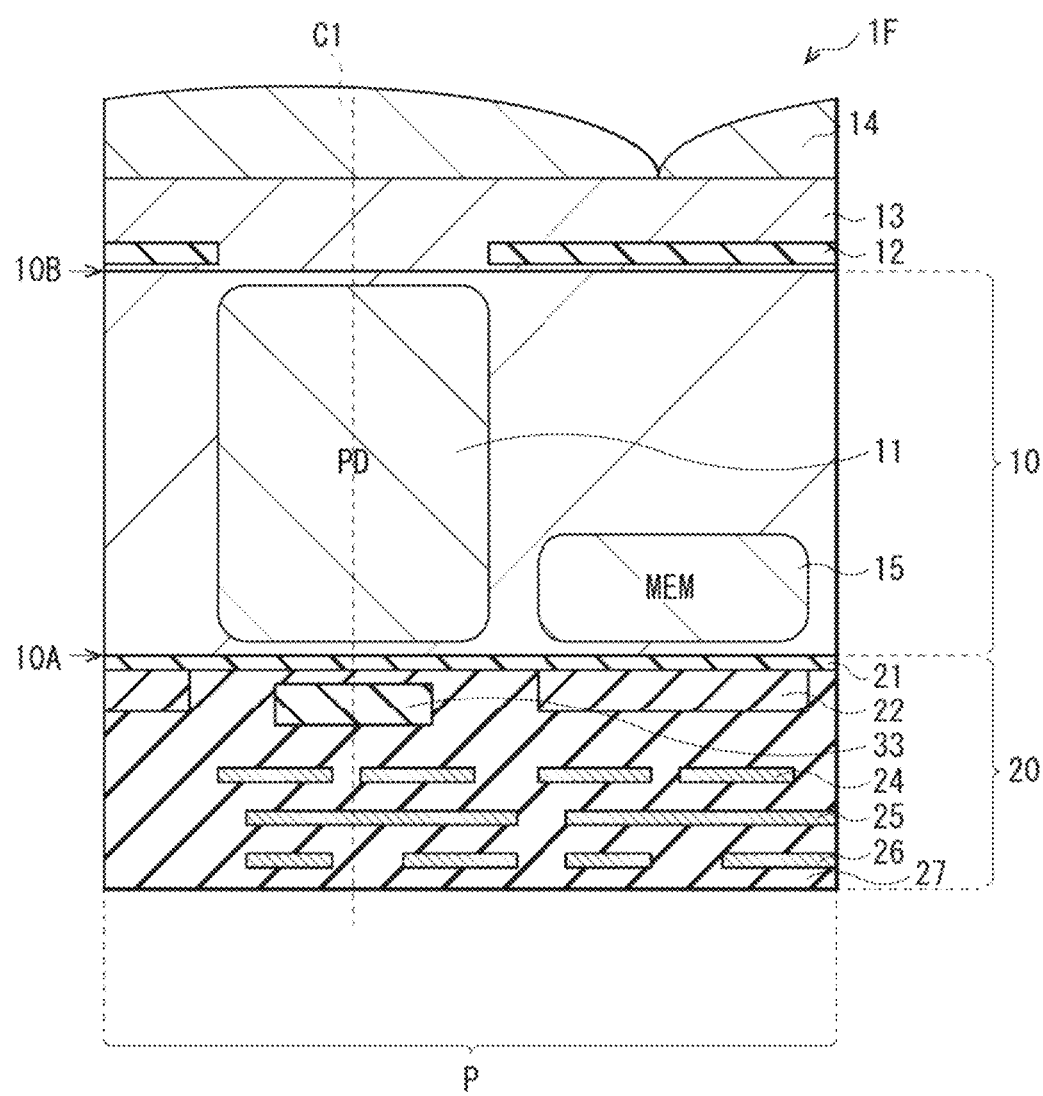
FIG. 12 is a cross-sectional schematic diagram illustrating an example of a schematic configuration of an imaging element according to a modification example 6 of the present disclosure.

FIG. 12 schematically illustrates an example of a cross-sectional configuration of an imaging element (imaging element 1F) according to the modification example 6 of the present disclosure. The imaging element 1F according to the present modification example achieves back-illuminated CIS having a so-called global shutter mode. The back-illuminated CIS includes, for example, an electric charge holding section 15 in the unit pixel P. The electric charge holding section 15 temporarily accumulates electric charge. The electric charge is generated by the light receiving section 11.

The global shutter mode is a mode for performing global exposure in which exposure is basically begun at the same time for all the pixels and is finished at the same time for all the pixels. Here, all the pixels refer to all the pixels in the portion appearing in an image and exclude dummy pixels or the like. In addition, in a case where a time difference or image distortion is small enough to raise no issue, the global shutter mode also includes a mode for changing regions for global exposure while performing global exposure not at the same time for all the pixels, but for a plurality of rows (e.g., several tens of rows). In addition, the global shutter mode also includes a mode for performing global exposure for the pixels in a predetermined region rather than all the pixels in the portion appearing in an image.

Figure 13:
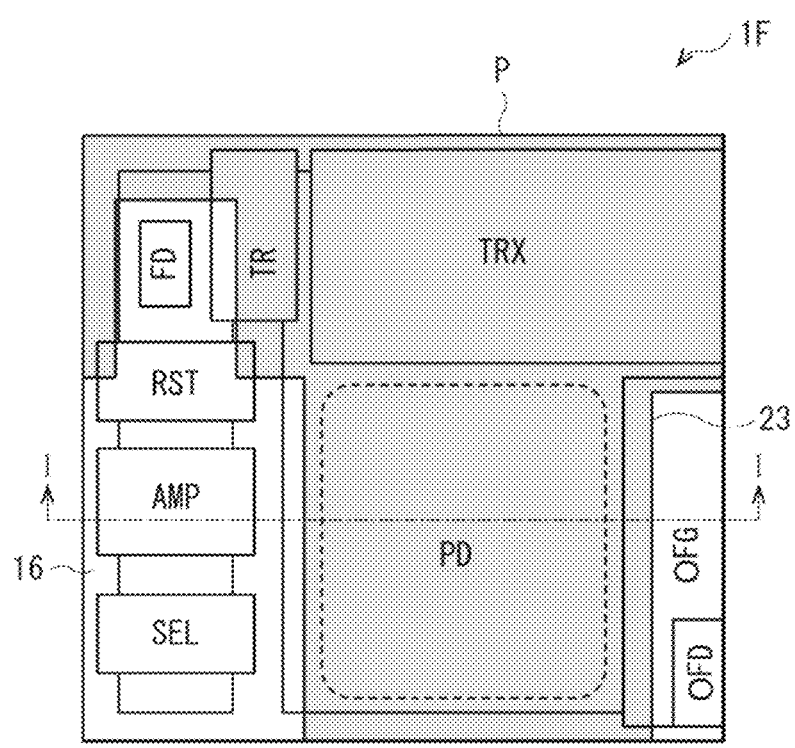
FIG. 13 is a schematic diagram illustrating an example of the planar configuration of the imaging element illustrated in FIG. 12.
Figure 14:
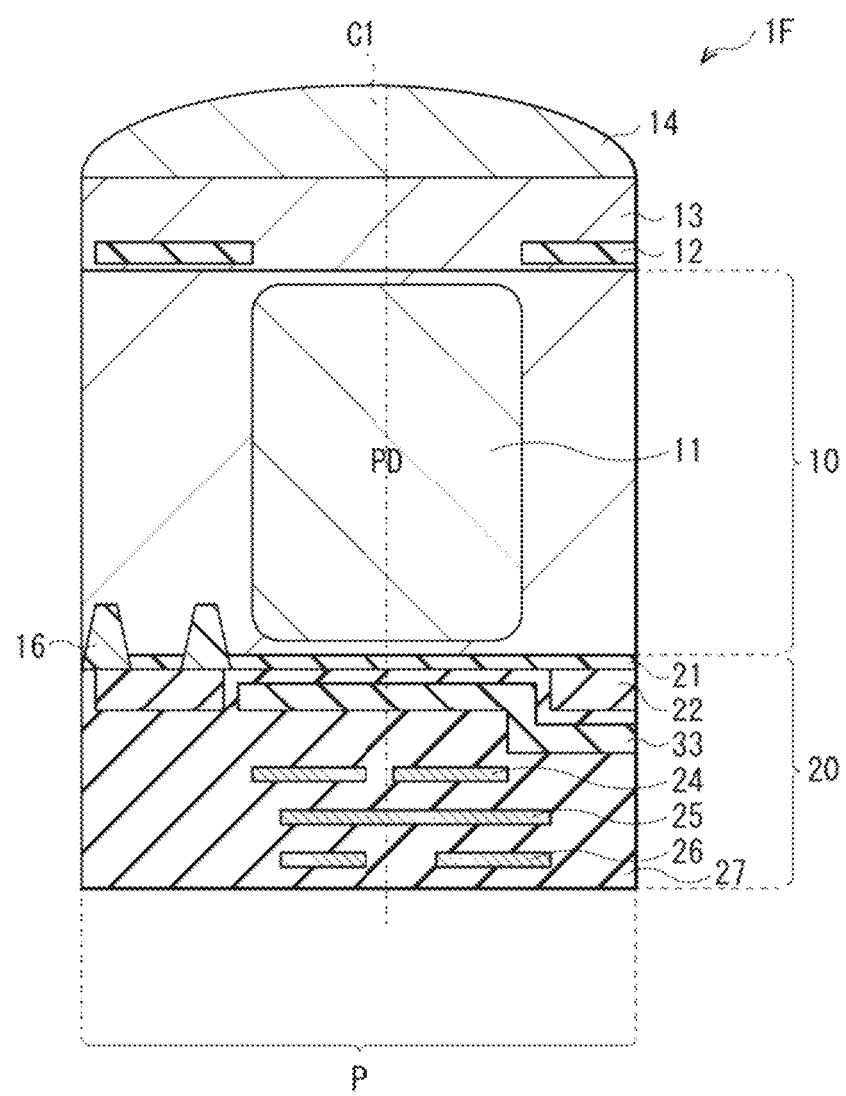
FIG. 14 is a cross-sectional schematic diagram illustrating another example of the schematic configuration of the imaging element according to the modification example 6 of the present disclosure.

FIG. 13 schematically illustrates an example of a specific planar configuration of the imaging element IF illustrated in FIG. 12. FIG. 14 schematically illustrates a cross-sectional configuration of the imaging element IF taken along the I-I line illustrated in FIG. 13.

The imaging element IF includes a conversion efficiency switching transistor OFG as a pixel transistor in addition to the transfer transistor TR, the amplification transistor AMP, the reset transistor RST, and the selection transistor SEL. The conversion efficiency switching transistor OFG initializes the PD. In other words, the conversion efficiency switching transistor OFG resets the PD. In addition, for example, an element separation section 16 is continuously formed at both ends of the respective gate electrodes of the amplification transistor AMP, the reset transistor RST, and the selection transistor SEL and the periphery of the unit pixel P.

The electric charge holding section (MEM) 15 is for temporarily holding electric charge generated by the light receiving section 11 until the electric charge is transferred to the floating diffusion FD as described above. The electric charge holding section 15 is formed to be buried, for example, on the first surface 10A side of the semiconductor substrate 10 as with the light receiving section 11.

The conversion efficiency switching transistor OFG resets the PD in accordance with a drive signal applied to the gate electrode thereof. The conversion efficiency switching transistor OFG includes, for example, a drain coupled to a power supply line VDD and a source coupled to the transfer transistor TR.

In the imaging element 1F, the floating diffusion FD, the amplification transistor AMP, the reset transistor RST, and the selection transistor SEL are disposed in parallel along one side of the unit pixel P. The electric charge holding section 15 is formed, for example, near the floating diffusion FD. The transfer transistor TR is disposed between the floating diffusion FD and the electric charge holding section 15. The conversion efficiency switching transistor OFG is disposed on the other side opposed to the side along which the floating diffusion FD, the amplification transistor AMP, the reset transistor RST, and the selection transistor SEL are disposed in parallel. The light receiving section 11 is formed between the floating diffusion FD, amplification transistor AMP, reset transistor RST, and selection transistor SEL that are disposed in parallel and the conversion efficiency switching transistor OFG.

The light reflecting layer 23 forms a reflective region below the light receiving section 11 as in the embodiment or the like described above. The reflective region is substantially symmetrical with respect to the optical center C1 of the unit pixel P. The light reflecting layer 23 further extends to cover the electric charge holding section 15 in a plan view from a wiring layer side S2 side. This makes it possible to reduce the leakage of light into the electric charge holding section 15, which causes aliasing (Parasitic Light Sensitivity).

As described above, the present modification example is applied to back-illuminated CIS having a global shutter mode and a portion of the light reflecting layer 23 extends to cover the electric charge holding section 15 in a plan view from the wiring layer side S2 side. Pieces of light are reflected by the light reflecting layer 23 to enter the light receiving section 11 again are hereby made substantially uniform with respect to the angles of incidence as in the embodiment described above. In addition, this reduces the leakage of light into the electric charge holding section 15. This also allows back-illuminated CIS having a global shutter mode to have higher image quality as in the embodiment described above.

2-7. Modification Example 7

In the embodiment or the like described above, the example has been described in which a pixel transistor is provided for each of the unit pixels P, but a pixel transistor may be shared, for example, between the two adjacent unit pixels P.

Figure 15:
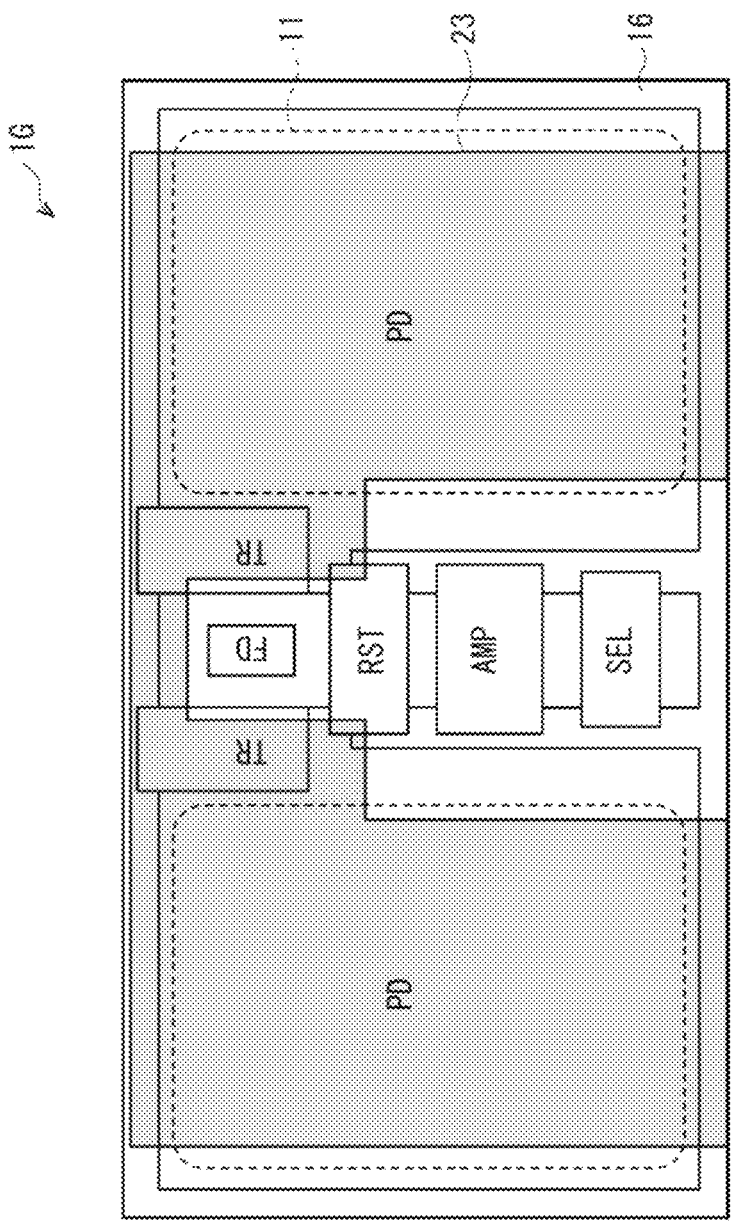
FIG. 15 is a plane schematic diagram illustrating an example of a schematic configuration of an imaging element according to a modification example 7 of the present disclosure.
Figure 16:
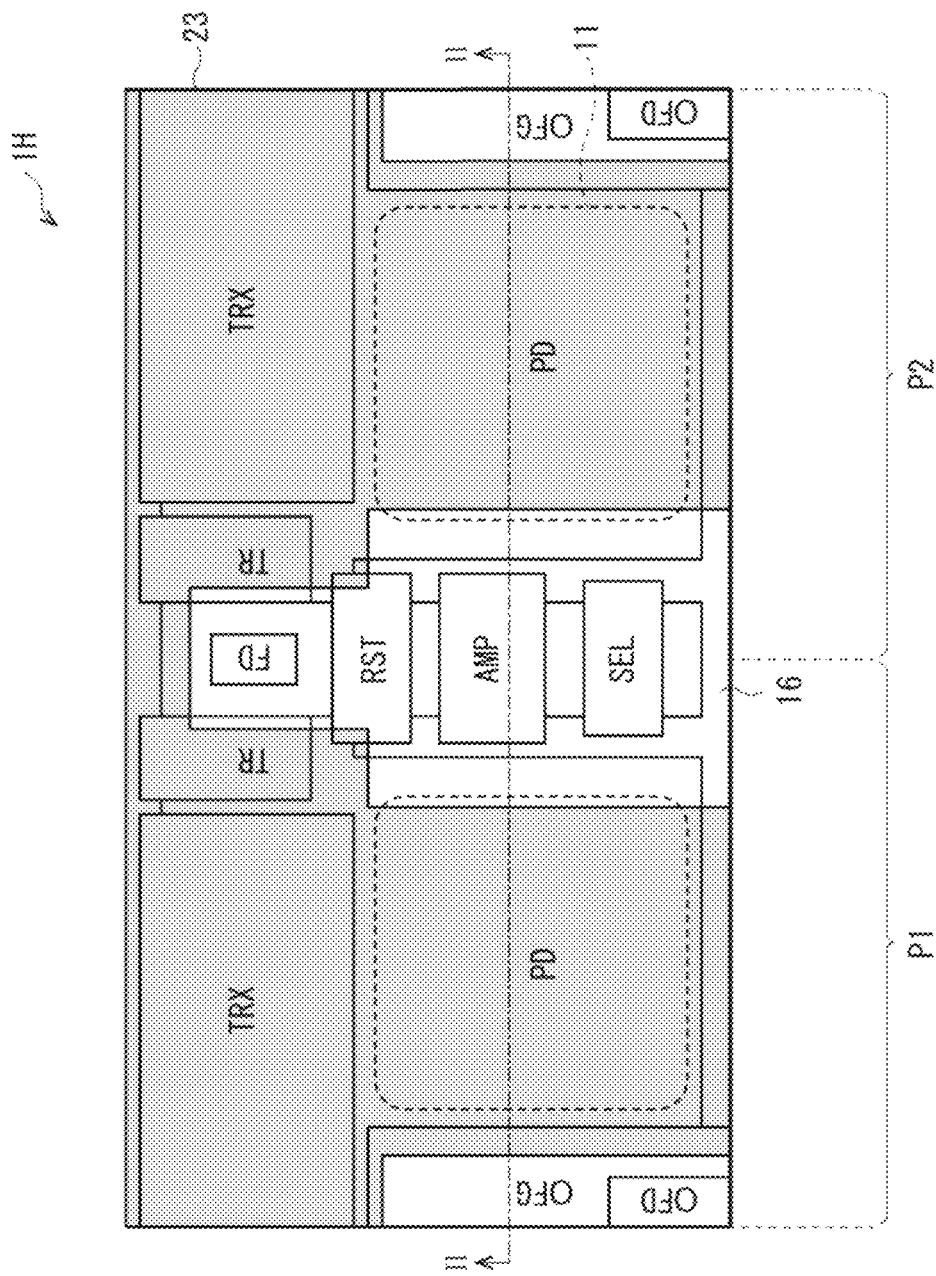
FIG. 16 is a plane schematic diagram illustrating another example of the schematic configuration of the imaging element according to the modification example 7 of the present disclosure.
Figure 17:
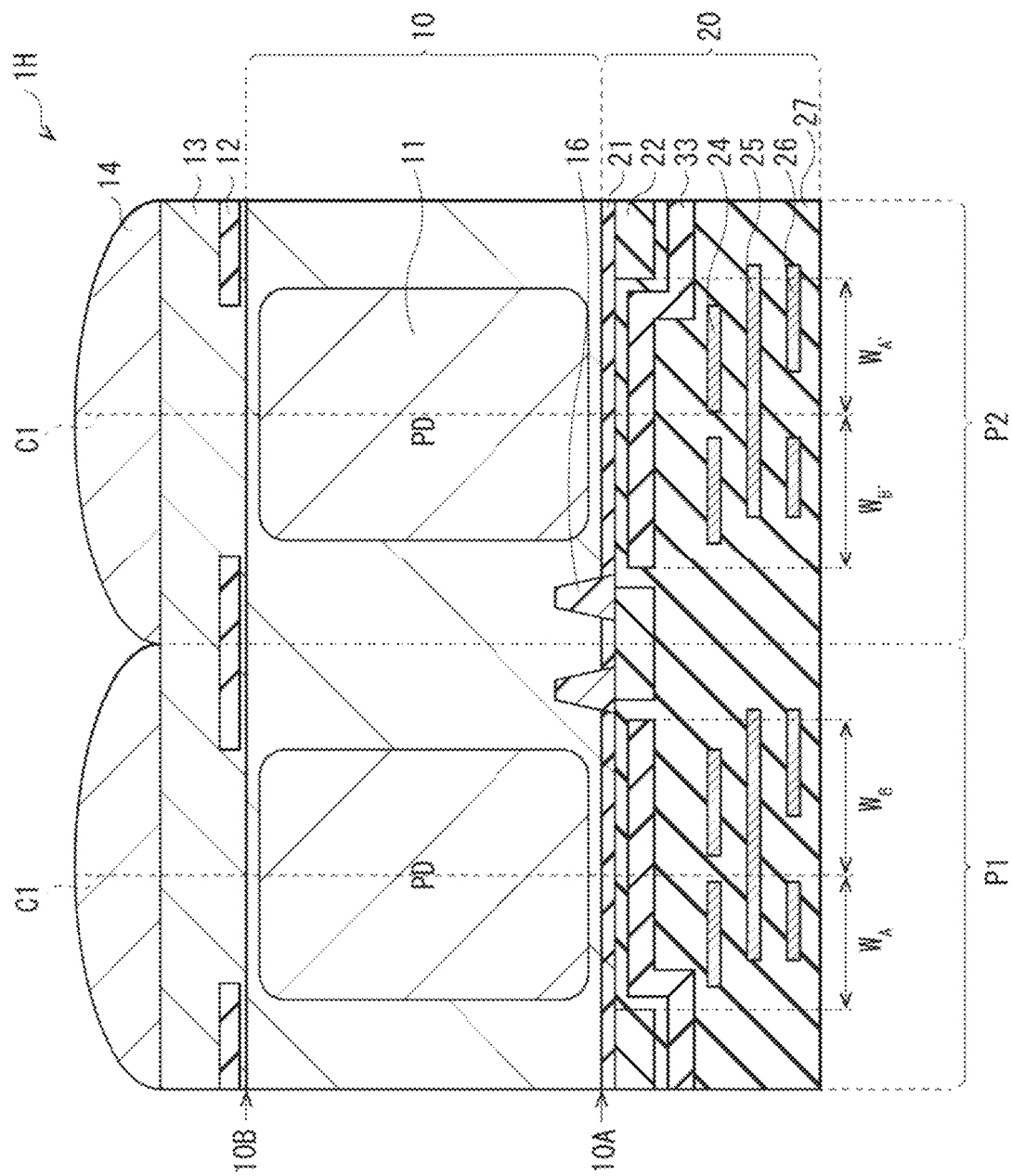
FIG. 17 is a cross-sectional schematic diagram of the imaging element illustrated in FIG. 16.

FIG. 15 schematically illustrates an example of a planar configuration of an imaging element 1G having a non-global shutter mode like the imaging element 1 described above. In the imaging element 1G, one pixel transistor is shared between the two adjacent unit pixels P. FIG. 16 schematically illustrates an example of a planar configuration of an imaging element 1H having a global shutter mode like the imaging element 1F described above. In the imaging element 1H, one pixel transistor is shared between the two adjacent unit pixels P (P1 and P2). FIG. 17 schematically illustrates a cross-sectional configuration of the imaging element 1H taken along the II-II line illustrated in FIG. 16.

In the imaging element 1G and the imaging element 1H, the respective light reflecting layers 23 each have a mirror-symmetrical shape between the adjacent unit pixels P.

Figure 18:
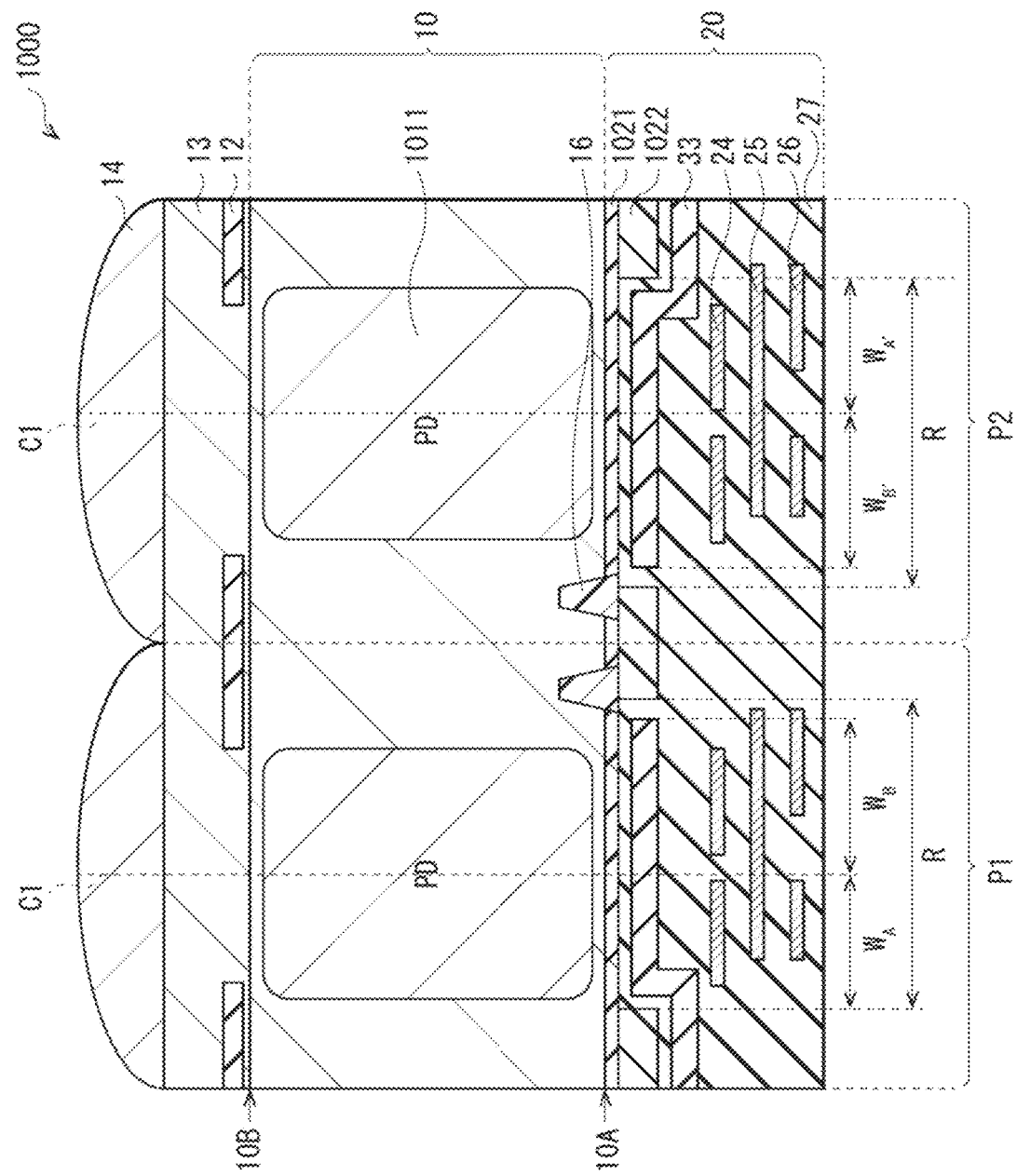
FIG. 18 is a cross-sectional schematic diagram of a typical imaging element.

A typical imaging element (imaging element 1000; see FIG. 18) in which a pixel transistor is shared between the two adjacent unit pixels P1 and P2 as in the imaging elements 1G and 1H is provided with a light shielding film for suppressing the leakage of light into the electric charge holding section (MEM). This light shielding film is formed by using, for example, tungsten (W). The light shielding film extends to the light receiving section. For example, as illustrated in FIG. 18, this light shielding film (light shielding film 1023) has an asymmetrical layout with respect to the optical center C1 including a light receiving section 101I. Specifically, the left and right $W_A$ and $W_B$ and $W_A'$ and $W_B'$ of the light shielding films 1023 with respect to the optical centers C1 respectively satisfy, for example, $W_A < W_B$ and $W_A' < W_B'$ in the regions R in which the gate electrodes (gate wiring lines 1021) of pixel transistors are not provided. This varies (strengthens and weakens) the sensitivity between an odd-numbered pixel (e.g., the unit pixel P1 in FIG. 17) and an even-numbered pixel (e.g., the unit pixel P2 in FIG. 17), for example, in the row direction among the plurality of pixels two-dimensionally disposed in the pixel section in a matrix. This appears as a vertical streak. In addition, shading peaks are different in the respective pixels.

In contrast, in the present modification example, the light reflecting layers 23 are provided that form reflective regions which are substantially symmetrical with respect to the optical centers C1 of the adjacent unit pixels P1 and P2 each including the light receiving section 11. Pieces of light reflected by the light reflecting layers 23 to enter the respective light receiving sections 11 again are thus made substantially uniform with respect to the angles of incidence in the unit pixels P1 and P2. Each of the shading shapes in the unit pixels P1 and P2 therefore has a peak in the middle of the field angle. This reduces sensitivity variations between an odd-numbered pixel and an even-numbered pixel, for example, in the row direction among the plurality of above-described pixels two-dimensionally disposed in a matrix. This makes it possible to increase the image quality.

2-8. Modification Example 8

Figure 19:
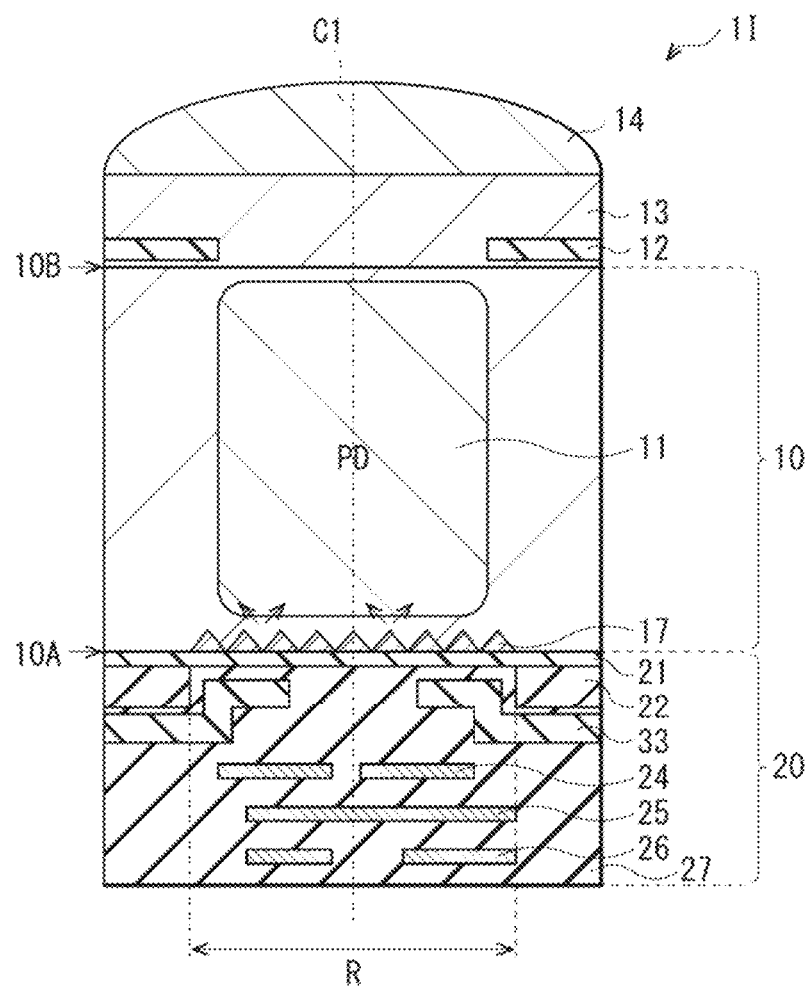
FIG. 19 is a cross-sectional schematic diagram illustrating an example of a schematic configuration of an imaging element according to a modification example 8 of the present disclosure.

FIG. 19 schematically illustrates an example of a cross-sectional configuration of an imaging element (imaging element 1I) according to the modification example 8 of the present disclosure. The imaging element 1I according to the present modification example is different from that of the embodiment described above in that the first surface 10A of the semiconductor substrate 10 is provided with an uneven structure 17.

Figure 20:
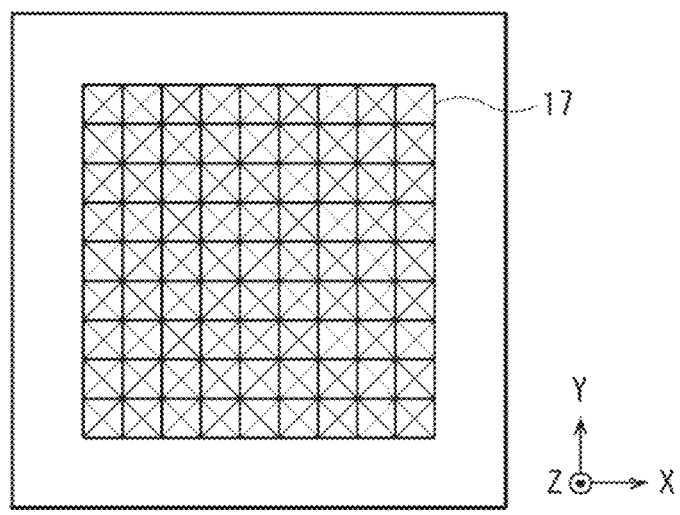
FIG. 20 is a planar schematic diagram illustrating an example of a configuration of an uneven structure illustrated in FIG. 19.

For example, as illustrated in FIG. 20, the plurality of uneven structures 17 is formed, for example, in a matrix in the region R. In the region R, none of the structures on the first surface 10A of the semiconductor substrate 10 are formed. The plurality of uneven structures 17 has pyramid-shaped excavations. These excavations are each filled, for example, with a silicon oxide ($SiO_x$) film 17A (see, for example, FIG. 22). This causes the surfaces of the uneven structures 17 to irregularly reflect light that has come from the second surface 10B of the semiconductor substrate 10 and passed through the light receiving section 11. A reduced amount of light pass through the semiconductor substrate 10.

Figure 21:
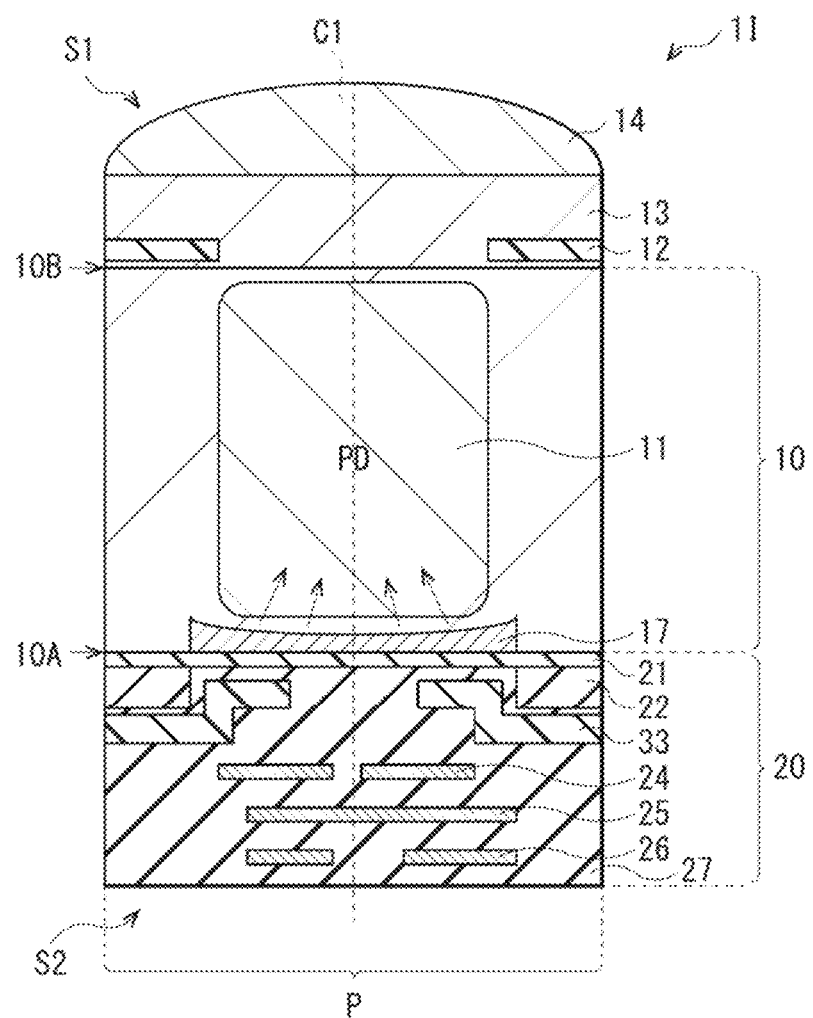
FIG. 21 is a cross-sectional schematic diagram illustrating another example of the schematic configuration of the imaging element according to the modification example 8 of the present disclosure.

In addition, concave excavations that are each substantially symmetrical with respect to the optical center C1, for example, as illustrated in FIG. 21 may be formed on the first surface 10A of the semiconductor substrate 10. Each of these concave excavations is filled, for example, with the $SiO_x$ film 17A as with the uneven structures 17 illustrated in FIG. 19 or another diagram. Thus, light that has come from the second surface 10B of the semiconductor substrate 10 and passed through the light receiving section 11 is reflected toward the light receiving section 11.

Figure 22:
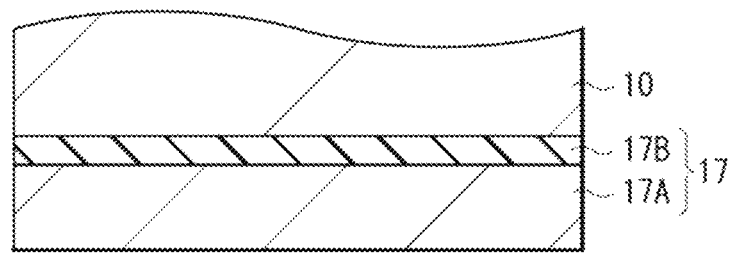
FIG. 22 is a schematic diagram illustrating an example of a cross-sectional configuration of an uneven structure of the imaging element illustrated in FIG. 19 or another diagram.

It is to be noted that there may be provided a reflective film 17B on the front surface of the semiconductor substrate 10 on which the uneven structures 17 are formed, for example, as illustrated in FIG. 22. The reflective film 17B includes a metal film or the like. This increases the light reflectance of the surfaces of the uneven structures 17.

In this way, in the present modification example, the uneven structures 17 are provided on the first surface 10A of the semiconductor substrate 10. This improves sensitivity variations in the unit pixels P, causing each of the shading shapes to have a peak in the middle of the field angle. In addition, sensitivity variations are reduced between an odd-numbered pixel and an even-numbered pixel in as imaging element as illustrated in the modification example 7 described above in which one pixel transistor is shared between the two adjacent unit pixels P. This makes it possible to increase the image quality.

2-9. Modification Example 9

Figure 23:
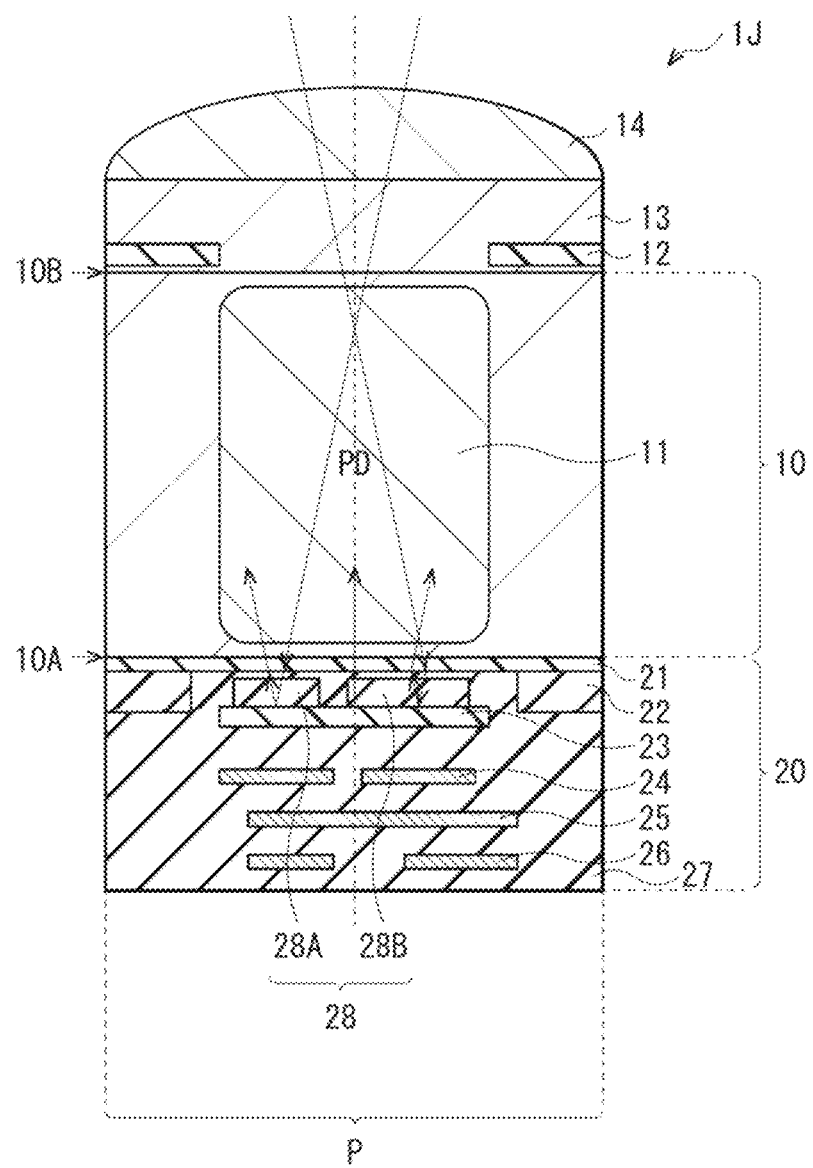
FIG. 23 is a cross-sectional schematic diagram illustrating an example of a schematic configuration of an imaging element according to a modification example 9 of the present disclosure.

FIG. 23 schematically illustrates an example of a cross-sectional configuration of an imaging element (imaging element 1J) according to the modification example 9 of the present disclosure. The imaging element 1J according to the present modification example is different from that of the embodiment described above in that there are provided light reflection control layers 28A and 28B on the light reflecting layer 23 formed in the embodiment or the like described above. The light reflection control layers 28A and 28B have different refractive indexes from each other.

It is possible to form each of the light reflection control layers 28 (28A and 28B) by using, for example, a metamaterial including a single layer film or a multilayer film in which a metal or dielectric nanostructure is used.

Figure 24:
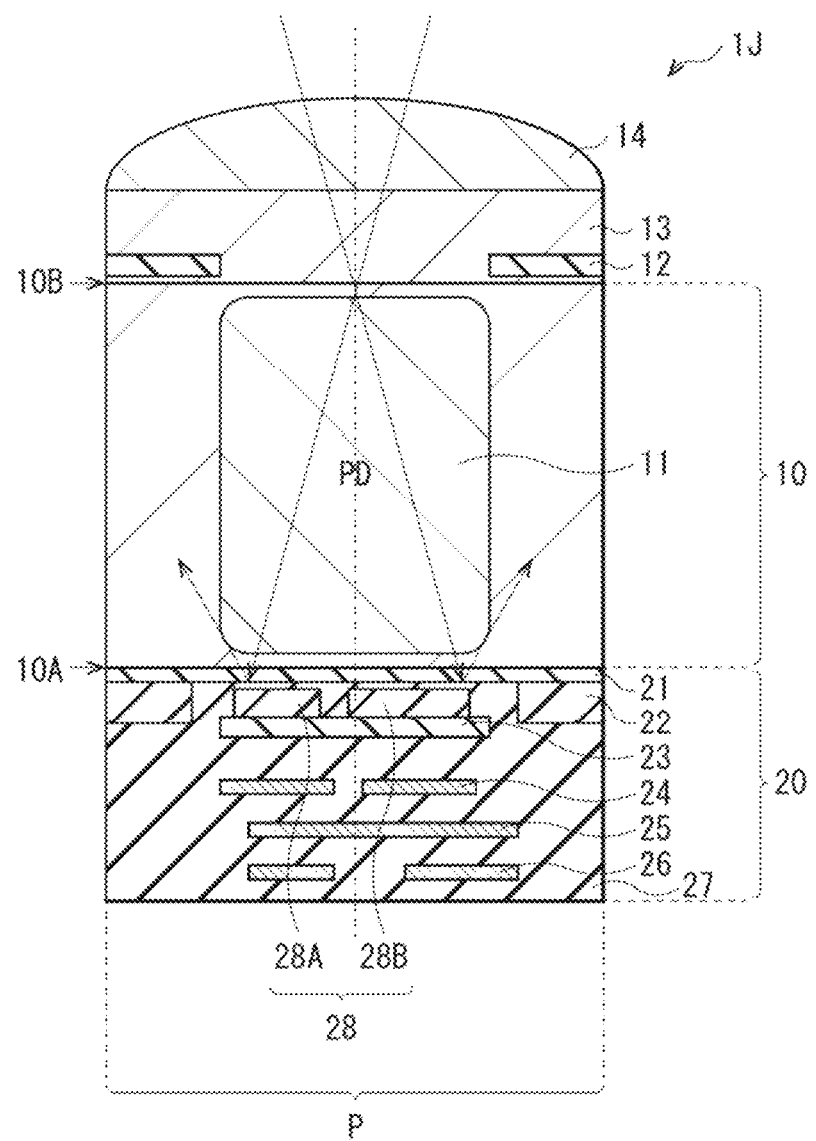
FIG. 24 is a diagram describing a reflection direction of light in a light reflection control layer of the imaging element illustrated in FIG. 23.

In this way, the light reflection control layer 28A and the light reflection control layer 28B each having a predetermined refractive index are provided on the light reflecting layer 23. This makes it possible to control the reflection direction of light on the surface of the light reflecting layer 23, for example, as illustrated in FIGS. 23 and 24. This makes it possible to further increase the image quality in addition to the effects of the embodiment described above.

2-10. Modification Example 10

Figure 25:
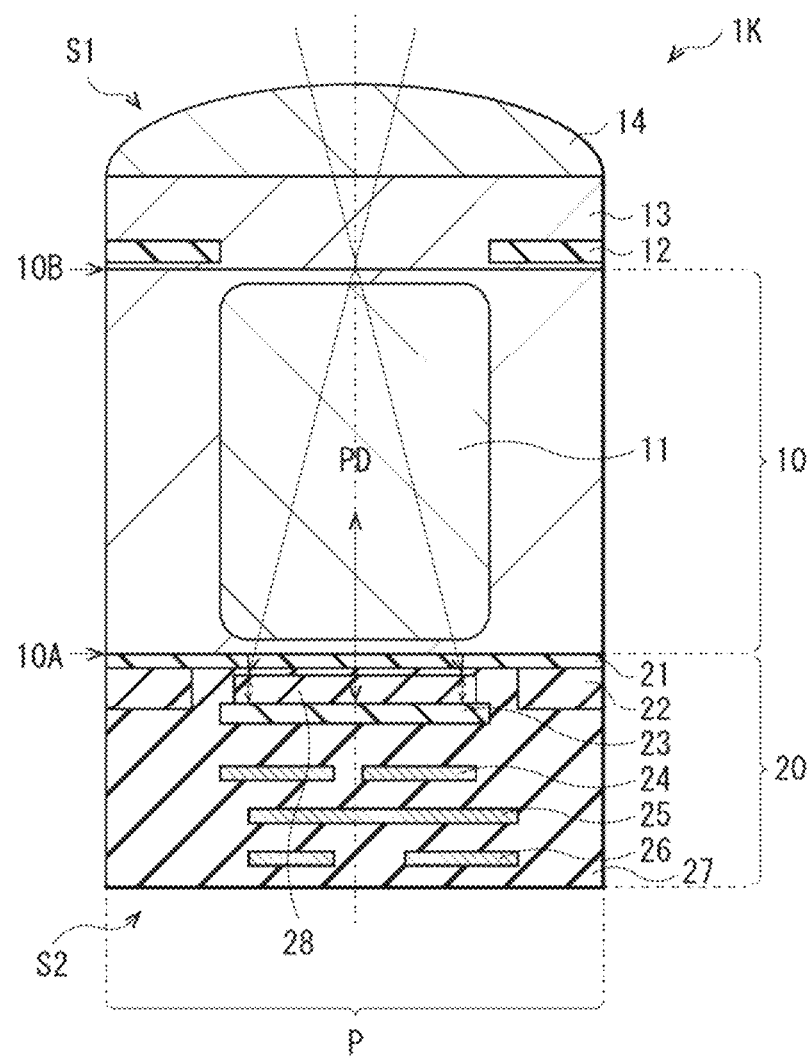
FIG. 25 is a cross-sectional schematic diagram illustrating an example of a schematic configuration of an imaging element according to a modification example 10 of the present disclosure.
Figure 26:
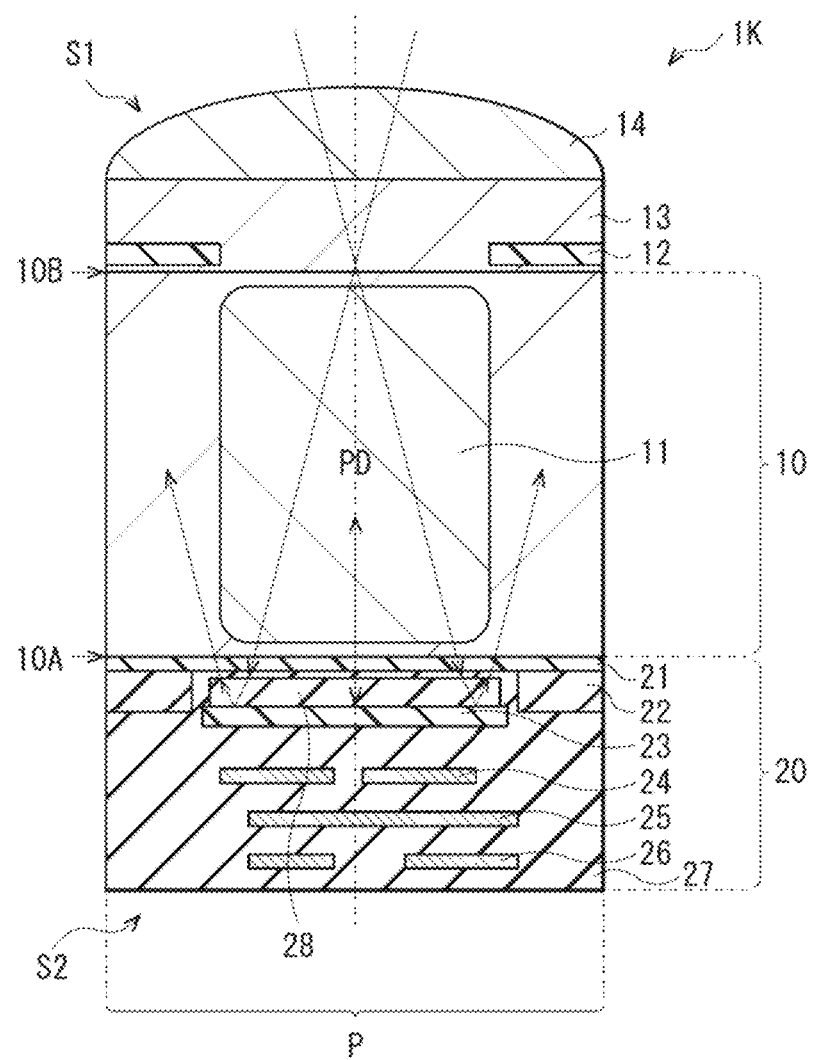
FIG. 26 is a diagram describing a reflection direction of light in a light reflection control layer of the imaging element illustrated in FIG. 25.

FIG. 25 schematically illustrates an example of a cross-sectional configuration of an imaging element (imaging element 1K) according to the modification example 10 of the present disclosure. In the modification example 9 described above, the example has been described in which each of the light reflection control layers 28 are formed by using a metamaterial, but the light reflection control layer 28 may be formed by using, for example, a meta-lens having different refractive indexes in the plane. This makes it possible to control the reflection direction of light on the surface of the light reflecting layer 23, for example, as illustrated in FIGS. 25 and 26. This makes it possible to further increase the image quality in addition to the effects of the embodiment described above as in the modification example 9 described above.

2-11. Modification Example 11

Figure 27:
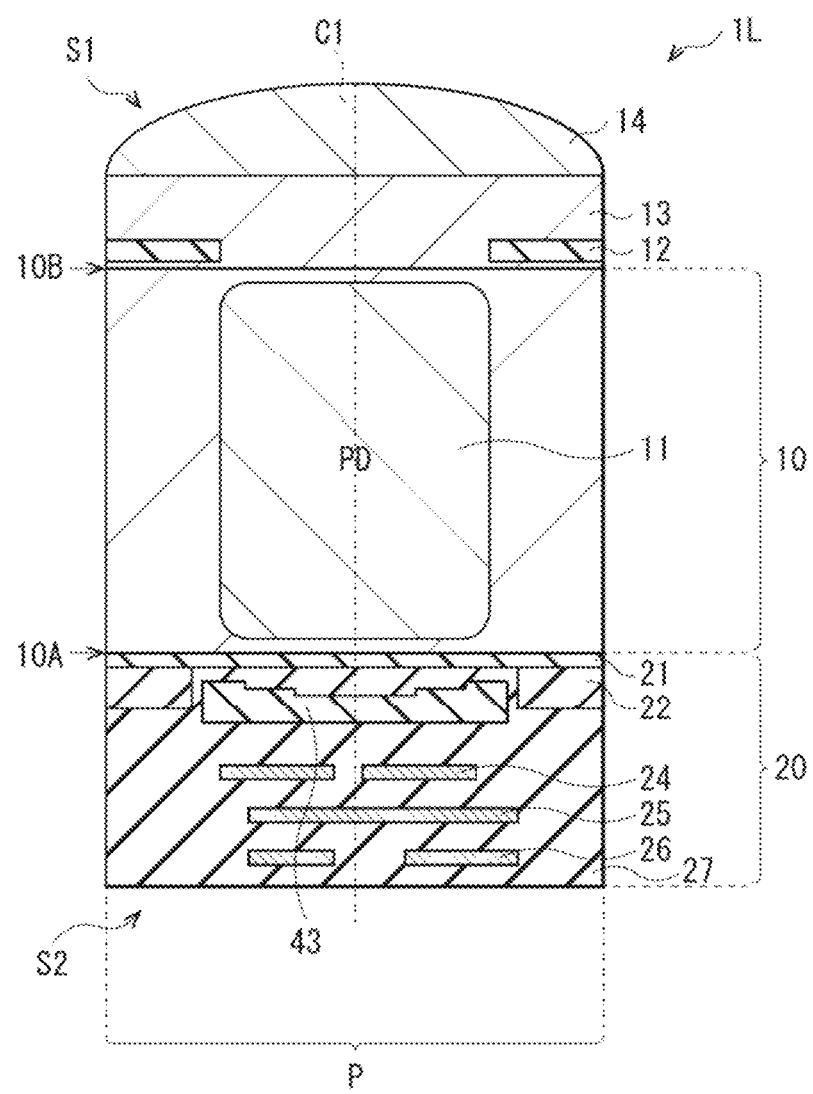
FIG. 27 is a cross-sectional schematic diagram illustrating an example of a schematic configuration of an imaging element according to a modification example 11 of the present disclosure.
Figure 28:
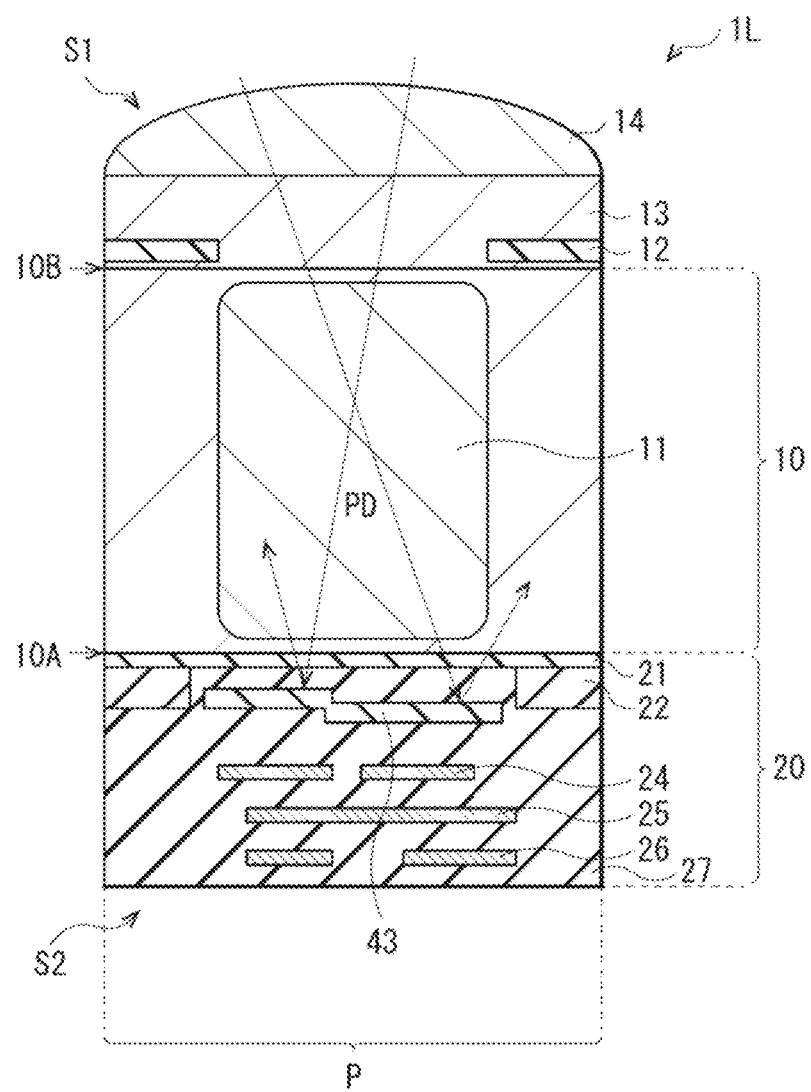
FIG. 28 is a plane schematic diagram illustrating another example of the schematic configuration of the imaging element according to the modification example 11 of the present disclosure.

FIG. 27 schematically illustrates an example of a cross-sectional configuration of an imaging element (imaging element 1L) according to the modification example 11 of the present disclosure. FIG. 28 schematically illustrates another example of the cross-sectional configuration of the imaging element 1L according to the modification example 11 of the present disclosure. The imaging element 1L according to the present modification example is different from that of the embodiment described above in that there is provided a light reflecting layer 43 in the region R in the multilayer wiring layer 20 provided on the first surface 10A side of the semiconductor substrate 10 and there are provided uneven structures or steps, for example, as illustrated in FIGS. 27 and 28 on the opposed surface to the first surface 10A of the semiconductor substrate 10. In the region R, none of the structures such as the gate electrode of a pixel transistor are provided, for example, as in the embodiment described above. The uneven structures or steps are substantially symmetrical or asymmetrical with respect to the optical center C1.

In this way, there are provided uneven structures or steps on the surface of the light reflecting layer 43. This makes it possible to control the reflection direction of light on the surface of the light reflecting layer 43. This makes it possible to further increase the image quality in addition to the effects of the embodiment described above.

In addition, in the embodiment described above, the example has been described in which the light reflecting layer 23 is formed by using a metal material such as tungsten (W) or a dielectric multilayer film, but the light reflecting layer 43 may be formed by using an insulating material having a different refractive index from that of the insulating material included in the interlayer insulating layer 27. It is also possible to control the reflection direction of light on the surface of the light reflecting layer 43 formed by using an insulating material.

3. Application Example

Figure 29:
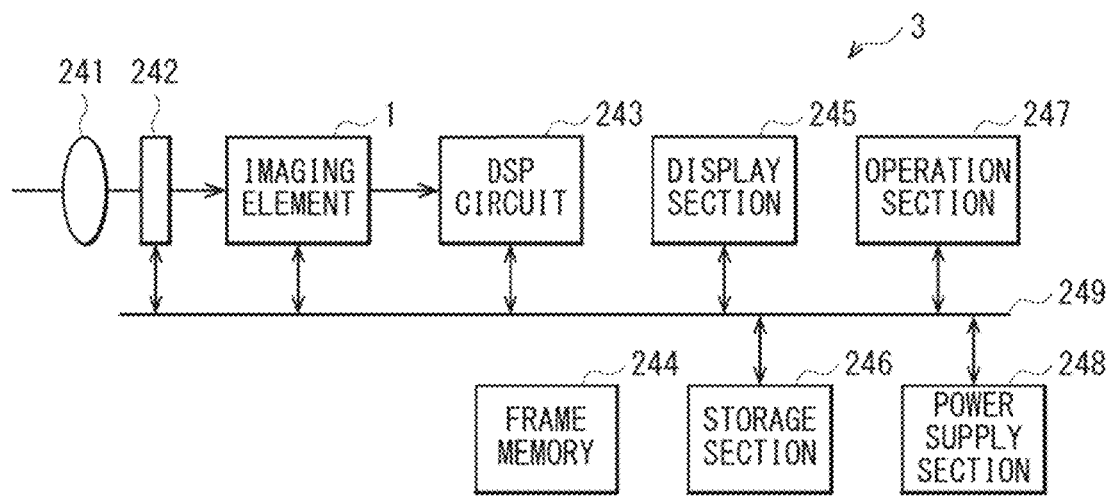
FIG. 29 is a diagram illustrating an example of a schematic configuration of an imaging system including the imaging element according to any of the embodiment and the modification examples 1 to 11 described above.

FIG. 29 illustrates an example of a schematic configuration of an imaging system 2 including the imaging element (e.g., the imaging element 1) according to any of the embodiment and the modification examples 1 to 11 described above.

The imaging system 2 is, for example, an electronic apparatus including an imaging device of a digital still camera, a video camera, or the like, a portable terminal device of a smartphone, a tablet-type terminal, or the like, or the like. The imaging system 2 includes, for example, the imaging element 1, an optical system 241, a shutter device 242, a DSP circuit 243, a frame memory 244, a display section 245, a storage section 246, an operation section 247, and a power supply section 248. In the imaging system 2, the imaging element 1, the DSP circuit 243, the frame memory 244, the display section 245, the storage section 246, the operation section 247, and the power supply section 248 are coupled to each other through a bus line 249.

The imaging element 1 outputs image data corresponding to incident light. The optical system 241 includes one or more lenses. The optical system 241 guides light (incident light) from a subject to the imaging element 1 to form an image on the light receiving surface of the imaging element 1. The shutter device 242 is disposed between the optical system 241 and the imaging element 1 and controls a period in which the imaging element 1 is irradiated with light and a period in which light is blocked under the control of the drive circuit. The DSP circuit 243 is a signal processing circuit that processes a signal (image data) outputted from the imaging element 1. The frame memory 244 temporarily holds the image data processed by the DSP circuit 243 in units of frames. The display section 245 includes, for example, a panel-type display device such as a liquid crystal panel or an organic EL (Electro Luminescence) panel and displays a moving image or a still image captured by the imaging element 1. The storage section 246 records the image data of a moving image or a still image captured by the imaging element 1 in a recording medium such as a semiconductor memory or a hard disk. The operation section 247 issues an operation instruction for various functions of the imaging system 2 in accordance with an operation by a user. The power supply section 248 appropriately supplies various kinds of power for operation to the imaging element 1, the DSP circuit 243, the frame memory 244, the display section 245, the storage section 246, and the operation section 247 that are supply targets.

Next, an imaging procedure of the imaging system 2 is described.

Figure 30:
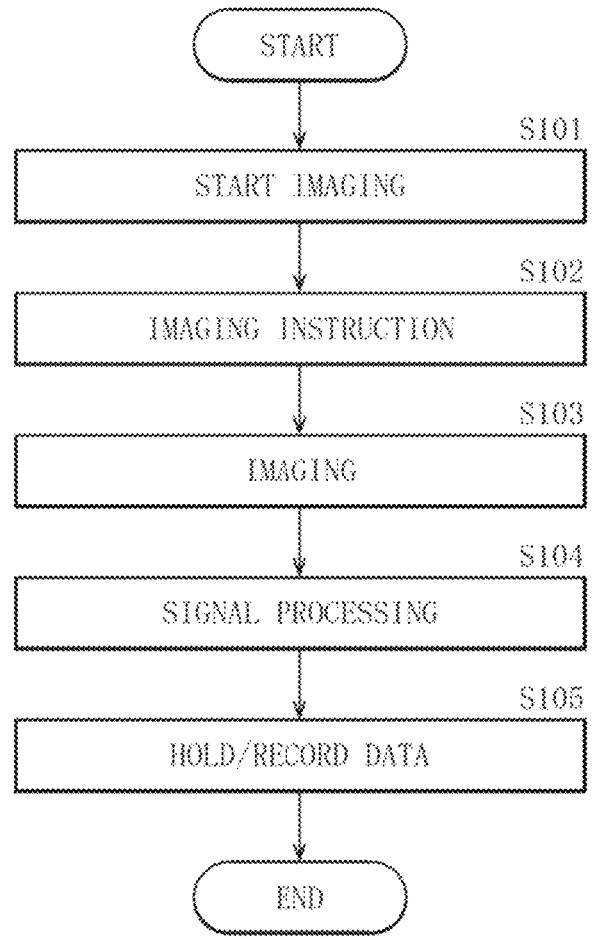
FIG. 30 is a diagram illustrating an example of an imaging procedure of the imaging system in FIG. 29.

FIG. 30 illustrates an example of a flowchart of an imaging operation of the imaging system 2. A user issues an instruction to start imaging by operating the operation section 247 (step S101). The operation section 247 then transmits an imaging instruction to the imaging element 1 (step S102). The imaging element 1 (specifically, the system control circuit) executes imaging in a predetermined imaging scheme upon receiving the imaging instruction (step S103).

The imaging element 1 outputs image data obtained by performing imaging to the DSP circuit 243. Here, the image data refers to data for all of the pixels of pixel signals generated on the basis of electric charge temporarily held in the floating diffusion FD. The DSP circuit 243 performs predetermined signal processing (e.g., a noise reduction process or the like) on the basis of the image data inputted from the imaging element 1 (step S104). The DSP circuit 243 causes the frame memory 244 to hold the image data subjected to the predetermined signal processing and the frame memory 244 causes the storage section 246 to store the image data (step S105). In this way, imaging is performed by the imaging system 2.

In the present application example, the imaging elements 1 and 1A to 1F according to the embodiment and the modification examples 1 to 6 described above are each applied to the imaging system 2. This allows the imaging element 1 to be smaller in size or higher in definition, making it possible to provide the imaging system 2 that is small in size or high in definition.

4. Practical Application Examples

Example of Practical Application to Mobile Body

The technology (the present technology) according to the present disclosure is applicable to a variety of products. For example, the technology according to the present disclosure may be achieved as a device mounted on any type of mobile body such as an automobile, an electric vehicle, a hybrid electric vehicle, a motorcycle, a bicycle, a personal mobility, an airplane, a drone, a vessel, or a robot.

Figure 31:
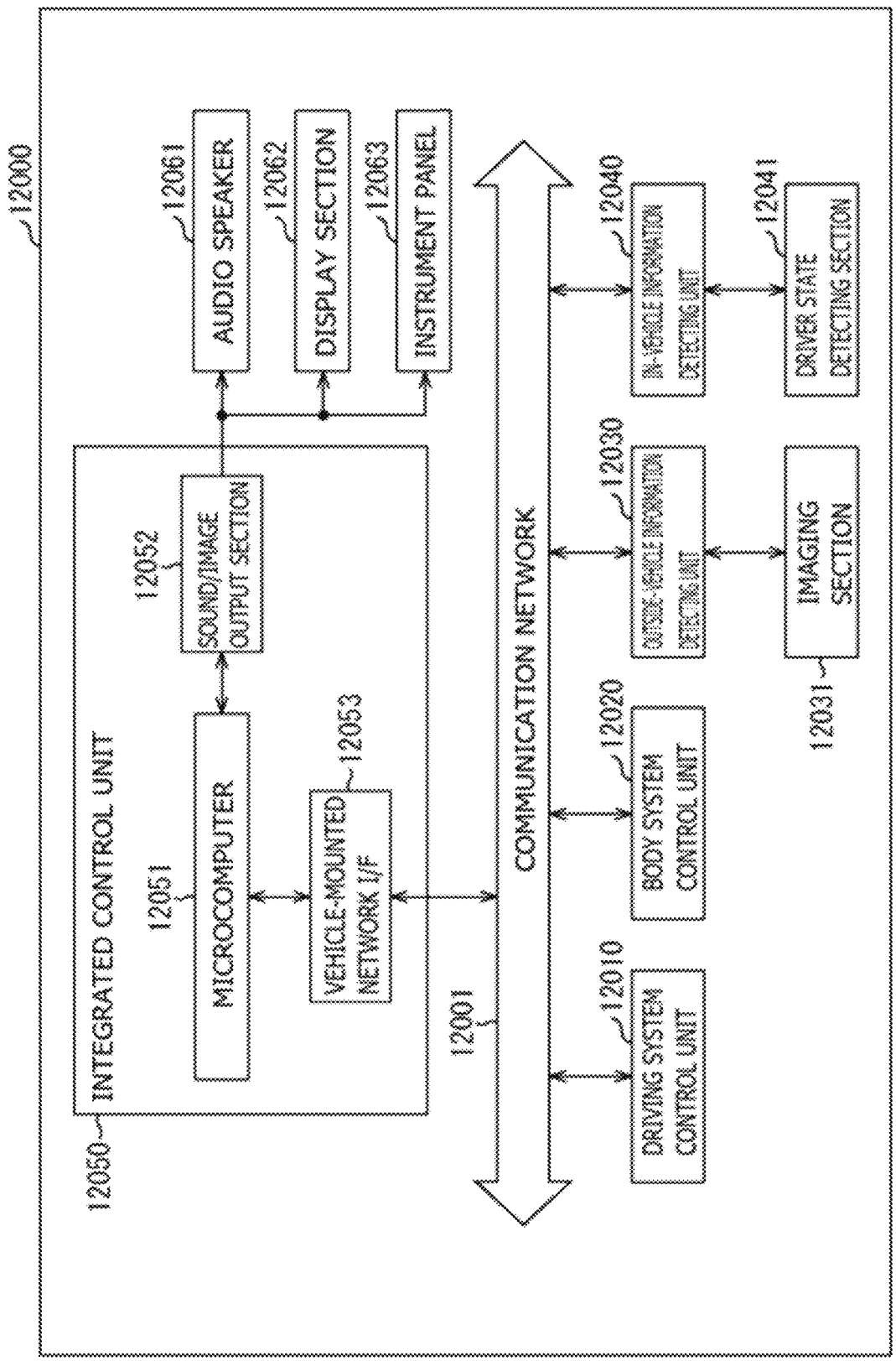
FIG. 31 is a block diagram depicting an example of schematic configuration of a vehicle control system.

FIG. 31 is a block diagram depicting an example of schematic configuration of a vehicle control system as an example of a mobile body control system to which the technology according to an embodiment of the present disclosure can be applied.

The vehicle control system 12000 includes a plurality of electronic control units connected to each other via a communication network 12001. In the example depicted in FIG.

31, the vehicle control system 12000 includes a driving system control unit 12010, a body system control unit 12020, an outside-vehicle information detecting unit 12030, an in-vehicle information detecting unit 12040, and an integrated control unit 12050. In addition, a microcomputer 12051, a sound/image output section 12052, and a vehicle-mounted network interface (I/F) 12053 are illustrated as a functional configuration of the integrated control unit 12050.

The driving system control unit 12010 controls the operation of devices related to the driving system of the vehicle in accordance with various kinds of programs. For example, the driving system control unit 12010 functions as a control device for a driving force generating device for generating the driving force of the vehicle, such as an internal combustion engine, a driving motor, or the like, a driving force transmitting mechanism for transmitting the driving force to wheels, a steering mechanism for adjusting the steering angle of the vehicle, a braking device for generating the braking force of the vehicle, and the like.

The body system control unit 12020 controls the operation of various kinds of devices provided to a vehicle body in accordance with various kinds of programs. For example, the body system control unit 12020 functions as a control device for a keyless entry system, a smart key system, a power window device, or various kinds of lamps such as a headlamp, a backup lamp, a brake lamp, a turn signal, a fog lamp, or the like. In this case, radio waves transmitted from a mobile device as an alternative to a key or signals of various kinds of switches can be input to the body system control unit 12020. The body system control unit 12020 receives these input radio waves or signals, and controls a door lock device, the power window device, the lamps, or the like of the vehicle.

The outside-vehicle information detecting unit 12030 detects information about the outside of the vehicle including the vehicle control system 12000. For example, the outside-vehicle information detecting unit 12030 is connected with an imaging section 12031. The outside-vehicle information detecting unit 12030 makes the imaging section 12031 image an image of the outside of the vehicle, and receives the imaged image. On the basis of the received image, the outside-vehicle information detecting unit 12030 may perform processing of detecting an object such as a human, a vehicle, an obstacle, a sign, a character on a road surface, or the like, or processing of detecting a distance thereto.

The imaging section 12031 is an optical sensor that receives light, and which outputs an electric signal corresponding to a received light amount of the light. The imaging section 12031 can output the electric signal as an image, or can output the electric signal as information about a measured distance. In addition, the light received by the imaging section 12031 may be visible light, or may be invisible light such as infrared rays or the like.

The in-vehicle information detecting unit 12040 detects information about the inside of the vehicle. The in-vehicle information detecting unit 12040 is, for example, connected with a driver state detecting section 12041 that detects the state of a driver. The driver state detecting section 12041, for example, includes a camera that images the driver. On the basis of detection information input from the driver state detecting section 12041, the in-vehicle information detecting unit 12040 may calculate a degree of fatigue of the driver or a degree of concentration of the driver, or may determine whether the driver is dozing.

The microcomputer 12051 can calculate a control target value for the driving force generating device, the steering mechanism, or the braking device on the basis of the information about the inside or outside of the vehicle which information is obtained by the outside-vehicle information detecting unit 12030 or the in-vehicle information detecting unit 12040, and output a control command to the driving system control unit 12010. For example, the microcomputer 12051 can perform cooperative control intended to implement functions of an advanced driver assistance system (ADAS) which functions include collision avoidance or shock mitigation for the vehicle, following driving based on a following distance, vehicle speed maintaining driving, a warning of collision of the vehicle, a warning of deviation of the vehicle from a lane, or the like.

In addition, the microcomputer 12051 can perform cooperative control intended for automatic driving, which makes the vehicle to travel autonomously without depending on the operation of the driver, or the like, by controlling the driving force generating device, the steering mechanism, the braking device, or the like on the basis of the information about the outside or inside of the vehicle which information is obtained by the outside-vehicle information detecting unit 12030 or the in-vehicle information detecting unit 12040.

In addition, the microcomputer 12051 can output a control command to the body system control unit 12020 on the basis of the information about the outside of the vehicle which information is obtained by the outside-vehicle information detecting unit 12030. For example, the microcomputer 12051 can perform cooperative control intended to prevent a glare by controlling the headlamp so as to change from a high beam to a low beam, for example, in accordance with the position of a preceding vehicle or an oncoming vehicle detected by the outside-vehicle information detecting unit 12030.

The sound/image output section 12052 transmits an output signal of at least one of a sound and an image to an output device capable of visually or auditorily notifying information to an occupant of the vehicle or the outside of the vehicle. In the example of FIG. 67, an audio speaker 12061, a display section 12062, and an instrument panel 12063 are illustrated as the output device. The display section 12062 may, for example, include at least one of an on-board display and a head-up display.

Figure 32:
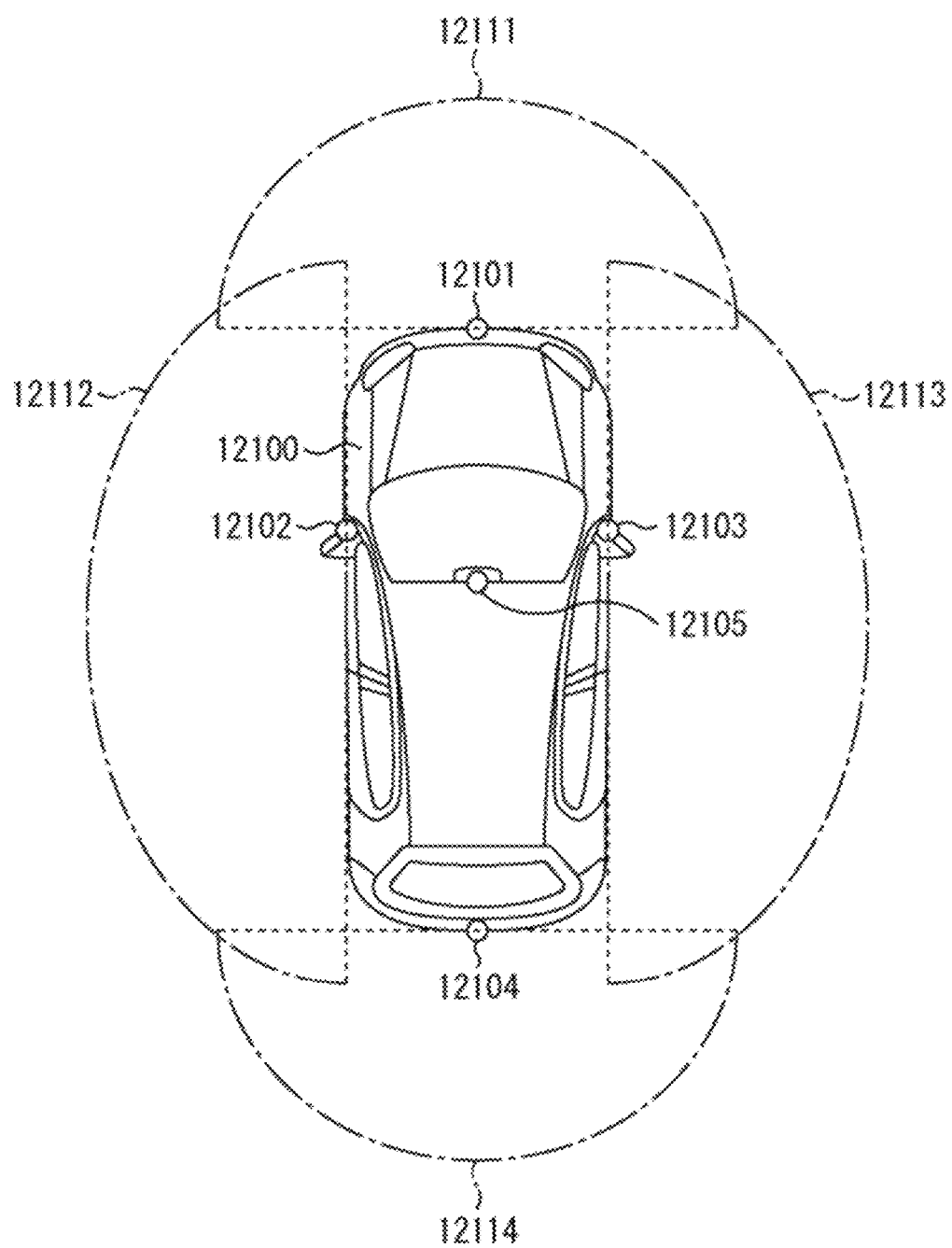
FIG. 32 is a diagram of assistance in explaining an example of installation positions of an outside-vehicle information detecting section and an imaging section.

FIG. 32 is a diagram depicting an example of the installation position of the imaging section 12031.

In FIG. 32, the imaging section 12031 includes imaging sections 12101, 12102, 12103, 12104, and 12105.

The imaging sections 12101, 12102, 12103, 12104, and 12105 are, for example, disposed at positions on a front nose, sideview mirrors, a rear bumper, and a back door of the vehicle 12100 as well as a position on an upper portion of a windshield within the interior of the vehicle. The imaging section 12101 provided to the front nose and the imaging section 12105 provided to the upper portion of the windshield within the interior of the vehicle obtain mainly an image of the front of the vehicle 12100. The imaging sections 12102 and 12103 provided to the sideview mirrors obtain mainly an image of the sides of the vehicle 12100. The imaging section 12104 provided to the rear bumper or the back door obtains mainly an image of the rear of the vehicle 12100. The imaging section 12105 provided to the upper portion of the windshield within the interior of the vehicle is used mainly to detect a preceding vehicle, a pedestrian, an obstacle, a signal, a traffic sign, a lane, or the like.

Incidentally, FIG. 32 depicts an example of photographing ranges of the imaging sections 12101 to 12104. An imaging range 12111 represents the imaging range of the imaging section 12101 provided to the front nose. Imaging ranges 12112 and 12113 respectively represent the imaging ranges of the imaging sections 12102 and 12103 provided to the sideview mirrors. An imaging range 12114 represents the imaging range of the imaging section 12104 provided to the rear bumper or the back door. A bird's-eye image of the vehicle 12100 as viewed from above is obtained by superimposing image data imaged by the imaging sections 12101 to 12104, for example.

At least one of the imaging sections 12101 to 12104 may have a function of obtaining distance information. For example, at least one of the imaging sections 12101 to 12104 may be a stereo camera constituted of a plurality of imaging elements, or may be an imaging element having pixels for phase difference detection.

For example, the microcomputer 12051 can determine a distance to each three-dimensional object within the imaging ranges 12111 to 12114 and a temporal change in the distance (relative speed with respect to the vehicle 12100) on the basis of the distance information obtained from the imaging sections 12101 to 12104, and thereby extract, as a preceding vehicle, a nearest three-dimensional object in particular that is present on a traveling path of the vehicle 12100 and which travels in substantially the same direction as the vehicle 12100 at a predetermined speed (for example, equal to or more than 0 km/hour). Further, the microcomputer 12051 can set a following distance to be maintained in front of a preceding vehicle in advance, and perform automatic brake control (including following stop control), automatic acceleration control (including following start control), or the like. It is thus possible to perform cooperative control intended for automatic driving that makes the vehicle travel autonomously without depending on the operation of the driver or the like.

For example, the microcomputer 12051 can classify three-dimensional object data on three-dimensional objects into three-dimensional object data of a two-wheeled vehicle, a standard-sized vehicle, a large-sized vehicle, a pedestrian, a utility pole, and other three-dimensional objects on the basis of the distance information obtained from the imaging sections 12101 to 12104, extract the classified three-dimensional object data, and use the extracted three-dimensional object data for automatic avoidance of an obstacle. For example, the microcomputer 12051 identifies obstacles around the vehicle 12100 as obstacles that the driver of the vehicle 12100 can recognize visually and obstacles that are difficult for the driver of the vehicle 12100 to recognize visually. Then, the microcomputer 12051 determines a collision risk indicating a risk of collision with each obstacle. In a situation in which the collision risk is equal to or higher than a set value and there is thus a possibility of collision, the microcomputer 12051 outputs a warning to the driver via the audio speaker 12061 or the display section 12062, and performs forced deceleration or avoidance steering via the driving system control unit 12010. The microcomputer 12051 can thereby assist in driving to avoid collision.

At least one of the imaging sections 12101 to 12104 may be an infrared camera that detects infrared rays. The microcomputer 12051 can, for example, recognize a pedestrian by determining whether or not there is a pedestrian in imaged images of the imaging sections 12101 to 12104. Such recognition of a pedestrian is, for example, performed by a procedure of extracting characteristic points in the imaged images of the imaging sections 12101 to 12104 as infrared cameras and a procedure of determining whether or not it is the pedestrian by performing pattern matching processing on a series of characteristic points representing the contour of the object. When the microcomputer 12051 determines that there is a pedestrian in the imaged images of the imaging sections 12101 to 12104, and thus recognizes the pedestrian, the sound/image output section 12052 controls the display section 12062 so that a square contour line for emphasis is displayed so as to be superimposed on the recognized pedestrian. The sound/image output section 12052 may also control the display section 12062 so that an icon or the like representing the pedestrian is displayed at a desired position.

The above has described the example of the mobile body control system to which the technology according to the present disclosure may be applied. The technology according to the present disclosure may be applied to the imaging section 12031 among the components described above. Specifically, the imaging device 100 is applicable to the imaging section 12031. The application of the technology according to the present disclosure to the imaging section 12031 makes it possible to obtain a high-definition shot image with less noise and it is thus possible to perform highly accurate control using the shot image in the mobile body control system.

Example of Practical Application to Endoscopic Surgery System

The technology (the present technology) according to the present disclosure is applicable to a variety of products. For example, the technology according to the present disclosure may be applied to an endoscopic surgery system.

Figure 33:
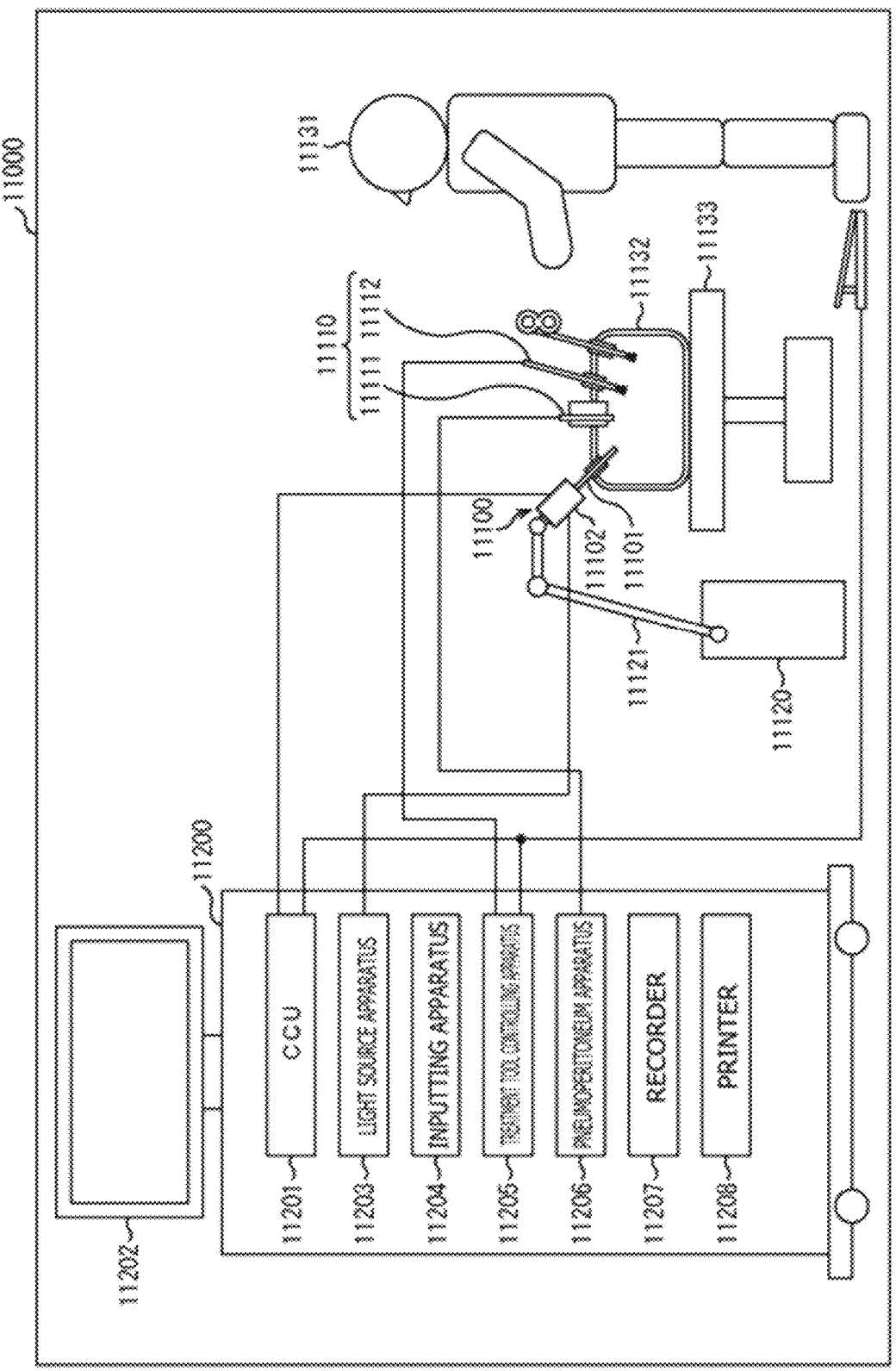
FIG. 33 is a view depicting an example of a schematic configuration of an endoscopic surgery system.

FIG. 33 is a view depicting an example of a schematic configuration of an endoscopic surgery system to which the technology according to an embodiment of the present disclosure (present technology) can be applied.

In FIG. 33, a state is illustrated in which a surgeon (medical doctor) 11131 is using an endoscopic surgery system 11000 to perform surgery for a patient 11132 on a patient bed 11133. As depicted, the endoscopic surgery system 11000 includes an endoscope 11100, other surgical tools 11110 such as a pneumoperitoneum tube 11111 and an energy device 11112, a supporting arm apparatus 11120 which supports the endoscope 11100 thereon, and a cart 11200 on which various apparatus for endoscopic surgery are mounted.

The endoscope 11100 includes a lens barrel 11101 having a region of a predetermined length from a distal end thereof to be inserted into a body cavity of the patient 11132, and a camera head 11102 connected to a proximal end of the lens barrel 11101. In the example depicted, the endoscope 11100 is depicted which includes as a rigid endoscope having the lens barrel 11101 of the hard type. However, the endoscope 11100 may otherwise be included as a flexible endoscope having the lens barrel 11101 of the flexible type.

The lens barrel 11101 has, at a distal end thereof, an opening in which an objective lens is fitted. A light source apparatus 11203 is connected to the endoscope 11100 such that light generated by the light source apparatus 11203 is introduced to a distal end of the lens barrel 11101 by a light guide extending in the inside of the lens barrel 11101 and is irradiated toward an observation target in a body cavity of the patient 11132 through the objective lens. It is to be noted that the endoscope 11100 may be a forward-viewing endoscope or may be an oblique-viewing endoscope or a side-viewing endoscope.

An optical system and an image pickup element are provided in the inside of the camera head 11102 such that reflected light (observation light) from the observation target is condensed on the image pickup element by the optical system. The observation light is photo-electrically converted by the image pickup element to generate an electric signal corresponding to the observation light, namely, an image signal corresponding to an observation image. The image signal is transmitted as RAW data to a CCU 11201.

The CCU 11201 includes a central processing unit (CPU), a graphics processing unit (GPU) or the like and integrally controls operation of the endoscope 11100 and a display apparatus 11202. Further, the CCU 11201 receives an image signal from the camera head 11102 and performs, for the image signal, various image processes for displaying an image based on the image signal such as, for example, a development process (demosaic process).

The display apparatus 11202 displays thereon an image based on an image signal, for which the image processes have been performed by the CCU 11201, under the control of the CCU 11201.

The light source apparatus 11203 includes a light source such as, for example, a light emitting diode (LED) and supplies irradiation light upon imaging of a surgical region to the endoscope 11100.

An inputting apparatus 11204 is an input interface for the endoscopic surgery system 11000. A user can perform inputting of various kinds of information or instruction inputting to the endoscopic surgery system 11000 through the inputting apparatus 11204. For example, the user would input an instruction or a like to change an image pickup condition (type of irradiation light, magnification, focal distance or the like) by the endoscope 11100.

A treatment tool controlling apparatus 11205 controls driving of the energy device 11112 for cautery or incision of a tissue, sealing of a blood vessel or the like. A pneumoperitoneum apparatus 11206 feeds gas into a body cavity of the patient 11132 through the pneumoperitoneum tube 11111 to inflate the body cavity in order to secure the field of view of the endoscope 11100 and secure the working space for the surgeon. A recorder 11207 is an apparatus capable of recording various kinds of information relating to surgery. A printer 11208 is an apparatus capable of printing various kinds of information relating to surgery in various forms such as a text, an image or a graph.

It is to be noted that the light source apparatus 11203 which supplies irradiation light when a surgical region is to be imaged to the endoscope 11100 may include a white light source which includes, for example, an LED, a laser light source or a combination of them. Where a white light source includes a combination of red, green, and blue (RGB) laser light sources, since the output intensity and the output timing can be controlled with a high degree of accuracy for each color (each wavelength), adjustment of the white balance of a picked up image can be performed by the light source apparatus 11203. Further, in this case, if laser beams from the respective RGB laser light sources are irradiated time-divisionally on an observation target and driving of the image pickup elements of the camera head 11102 are controlled in synchronism with the irradiation timings. Then images individually corresponding to the R, G and B colors can be also picked up time-divisionally. According to this method, a color image can be obtained even if color filters are not provided for the image pickup element.

Further, the light source apparatus 11203 may be controlled such that the intensity of light to be outputted is changed for each predetermined time. By controlling driving of the image pickup element of the camera head 11102 in synchronism with the timing of the change of the intensity of light to acquire images time-divisionally and synthesizing the images, an image of a high dynamic range free from underexposed blocked up shadows and overexposed highlights can be created.

Further, the light source apparatus 11203 may be configured to supply light of a predetermined wavelength band ready for special light observation. In special light observation, for example, by utilizing the wavelength dependency of absorption of light in a body tissue to irradiate light of a narrow band in comparison with irradiation light upon ordinary observation (namely, white light), narrow band observation (narrow band imaging) of imaging a predetermined tissue such as a blood vessel of a superficial portion of the mucous membrane or the like in a high contrast is performed. Alternatively, in special light observation, fluorescent observation for obtaining an image from fluorescent light generated by irradiation of excitation light may be performed. In fluorescent observation, it is possible to perform observation of fluorescent light from a body tissue by irradiating excitation light on the body tissue (autofluorescence observation) or to obtain a fluorescent light image by locally injecting a reagent such as indocyanine green (ICG) into a body tissue and irradiating excitation light corresponding to a fluorescent light wavelength of the reagent upon the body tissue. The light source apparatus 11203 can be configured to supply such narrow-band light and/or excitation light suitable for special light observation as described above.

Figure 34:
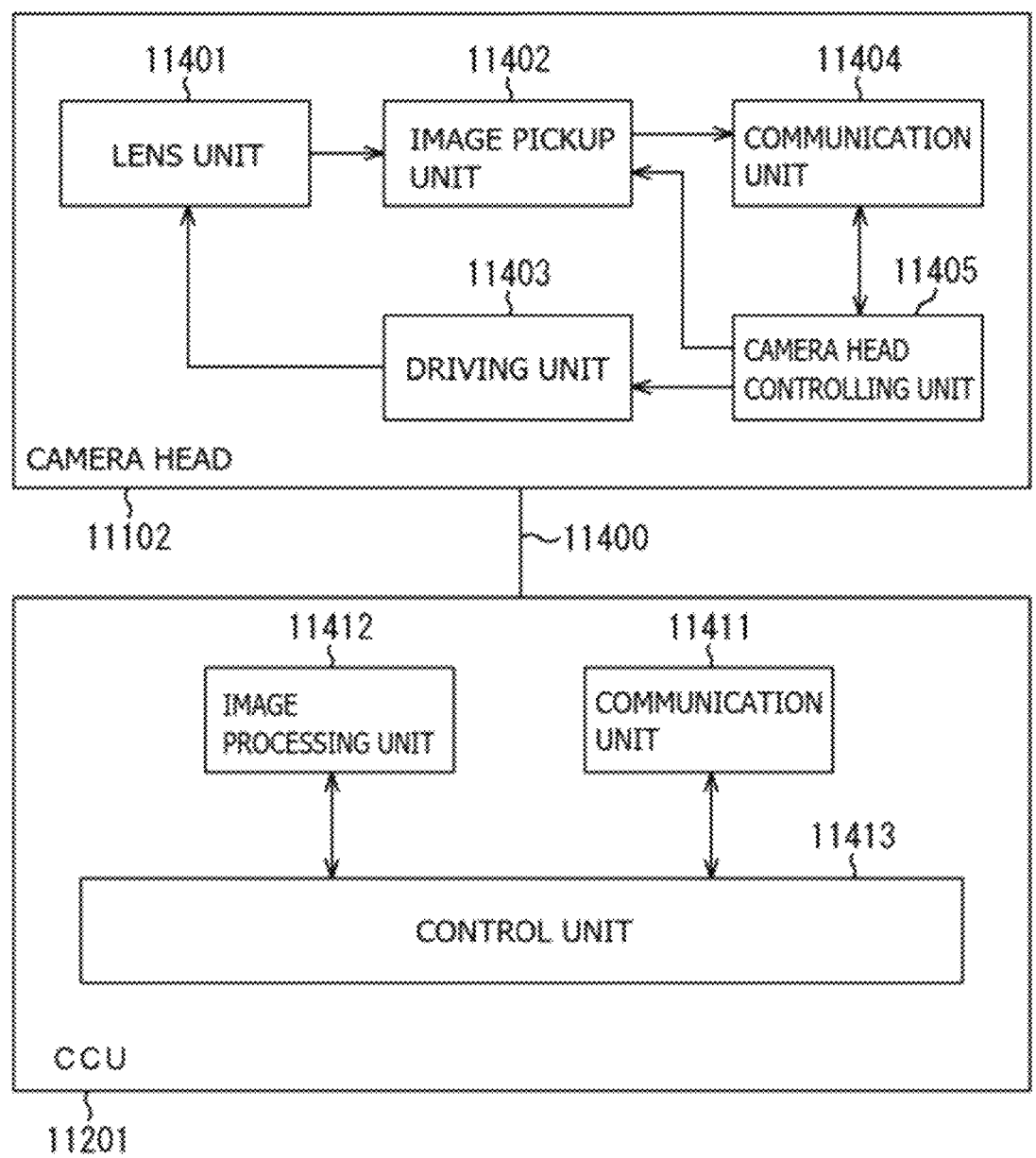
FIG. 34 is a block diagram depicting an example of a functional configuration of a camera head and a camera control unit (CCU).

FIG. 34 is a block diagram depicting an example of a functional configuration of the camera head 11102 and the CCU 11201 depicted in FIG. 33.

The camera head 11102 includes a lens unit 11401, an image pickup unit 11402, a driving unit 11403, a communication unit 11404 and a camera head controlling unit 11405. The CCU 11201 includes a communication unit 11411, an image processing unit 11412 and a control unit 11413. The camera head 11102 and the CCU 11201 are connected for communication to each other by a transmission cable 11400.

The lens unit 11401 is an optical system, provided at a connecting location to the lens barrel 11101. Observation light taken in from a distal end of the lens barrel 11101 is guided to the camera head 11102 and introduced into the lens unit 11401. The lens unit 11401 includes a combination of a plurality of lenses including a zoom lens and a focusing lens.

The number of image pickup elements which is included by the image pickup unit 11402 may be one (single-plate type) or a plural number (multi-plate type). Where the image pickup unit 11402 is configured as that of the multi-plate type, for example, image signals corresponding to respective R, G and B are generated by the image pickup elements, and the image signals may be synthesized to obtain a color image. The image pickup unit 11402 may also be configured so as to have a pair of image pickup elements for acquiring respective image signals for the right eye and the left eye ready for three dimensional (3D) display. If 3D display is performed, then the depth of a living body tissue in a surgical region can be comprehended more accurately by the surgeon 11131. It is to be noted that, where the image pickup unit 11402 is configured as that of stereoscopic type, a plurality of systems of lens units 11401 are provided corresponding to the individual image pickup elements.

Further, the image pickup unit 11402 may not necessarily be provided on the camera head 11102. For example, the image pickup unit 11402 may be provided immediately behind the objective lens in the inside of the lens barrel 11101.

The driving unit 11403 includes an actuator and moves the zoom lens and the focusing lens of the lens unit 11401 by a predetermined distance along an optical axis under the control of the camera head controlling unit 11405. Consequently, the magnification and the focal point of a picked up image by the image pickup unit 11402 can be adjusted suitably.

The communication unit 11404 includes a communication apparatus for transmitting and receiving various kinds of information to and from the CCU 11201. The communication unit 11404 transmits an image signal acquired from the image pickup unit 11402 as RAW data to the CCU 11201 through the transmission cable 11400.

In addition, the communication unit 11404 receives a control signal for controlling driving of the camera head 11102 from the CCU 11201 and supplies the control signal to the camera head controlling unit 11405. The control signal includes information relating to image pickup conditions such as, for example, information that a frame rate of a picked up image is designated, information that an exposure value upon image picking up is designated and/or information that a magnification and a focal point of a picked up image are designated.

It is to be noted that the image pickup conditions such as the frame rate, exposure value, magnification or focal point may be designated by the user or may be set automatically by the control unit 11413 of the CCU 11201 on the basis of an acquired image signal. In the latter case, an auto exposure (AE) function, an auto focus (AF) function and an auto white balance (AWB) function are incorporated in the endoscope 11100.

The camera head controlling unit 11405 controls driving of the camera head 11102 on the basis of a control signal from the CCU 11201 received through the communication unit 11404.

The communication unit 11411 includes a communication apparatus for transmitting and receiving various kinds of information to and from the camera head 11102. The communication unit 11411 receives an image signal transmitted thereto from the camera head 11102 through the transmission cable 11400.

Further, the communication unit 11411 transmits a control signal for controlling driving of the camera head 11102 to the camera head 11102. The image signal and the control signal can be transmitted by electrical communication, optical communication or the like.

The image processing unit 11412 performs various image processes for an image signal in the form of RAW data transmitted thereto from the camera head 11102.

The control unit 11413 performs various kinds of control relating to image picking up of a surgical region or the like by the endoscope 11100 and display of a picked up image obtained by image picking up of the surgical region or the like. For example, the control unit 11413 creates a control signal for controlling driving of the camera head 11102.

Further, the control unit 11413 controls, on the basis of an image signal for which image processes have been performed by the image processing unit 11412, the display apparatus 11202 to display a picked up image in which the surgical region or the like is imaged. Thereupon, the control unit 11413 may recognize various objects in the picked up image using various image recognition technologies. For example, the control unit 11413 can recognize a surgical tool such as forceps, a particular living body region, bleeding, mist when the energy device 11112 is used and so forth by detecting the shape, color and so forth of edges of objects included in a picked up image. The control unit 11413 may cause, when it controls the display apparatus 11202 to display a picked up image, various kinds of surgery supporting information to be displayed in an overlapping manner with an image of the surgical region using a result of the recognition. Where surgery supporting information is displayed in an overlapping manner and presented to the surgeon 11131, the burden on the surgeon 11131 can be reduced and the surgeon 11131 can proceed with the surgery with certainty.

The transmission cable 11400 which connects the camera head 11102 and the CCU 11201 to each other is an electric signal cable ready for communication of an electric signal, an optical fiber ready for optical communication or a composite cable ready for both of electrical and optical communications.

Here, while, in the example depicted, communication is performed by wired communication using the transmission cable 11400, the communication between the camera head 11102 and the CCU 11201 may be performed by wireless communication.

The above has described the example of the endoscopic surgery system to which the technology according to the present disclosure may be applied. The technology according to the present disclosure may be favorably applied to the image pickup unit 11402 provided to the camera head 11102 of the endoscope 11100 among the components described above. The application of the technology according to the present disclosure to the image pickup unit 11402 allows the image pickup unit 11402 to be smaller in size or higher in definition and it is thus possible to provide the endoscope 11100 that is small in size or high in definition.

Although the present disclosure has been described above with reference to the embodiment and the modification examples 1 to 11 and the application example and the practical application examples, the present disclosure is not limited to the embodiment or the like described above. A variety of modifications are possible. There may be provided, for example, a red color filter, a green color filter, and a blue color filter, for example, below the on-chip lenses 14 of the respective unit pixels P, for example. The red color filter transmits light in the red wavelength range. The green color filter transmits light in the green wavelength range. The blue color filter transmits light in the blue wavelength range. For example, there may be provided optical members such as color filters that are provided to have a regular color arrangement (e.g., Bayer arrangement) in the pixel section 100A.

It is to be noted that the effects described in this specification are merely illustrative, but not limited to the description. There may be other effects.

It is to be noted that the present disclosure may also have configurations as follows. According to the present technology having the following configurations, the light reflecting layer is provided in the region in the multilayer wiring layer. The multilayer wiring layer is provided on the second surface side of the first semiconductor substrate opposite to the first surface. The first semiconductor substrate includes the light receiving section for each of the pixels. The first surface serves as the light incidence surface. The second surface includes the plurality of structures. In the region, none of the structures are formed. The light reflecting layer has the reflective region or the non-reflective region with the interlayer insulating layer interposed in between. The reflective region or the non-reflective region is substantially symmetrical with respect to the optical center of the pixel. Pieces of light reflected by the light reflecting layer to enter the light receiving section again are hereby made substantially uniform with respect to the angles of incidence. This makes it possible to increase the image quality.

(1)

An imaging element including:

a semiconductor substrate having a first surface and a second surface, the first surface serving as a light incidence surface, the second surface being opposite to the first surface, the semiconductor substrate including a light receiving section for each of pixels, the light receiving section generating electric charge through photoelectric conversion, the electric charge corresponding to an amount of received light;

a multilayer wiring layer that is provided on the second surface side of the semiconductor substrate, the multilayer wiring layer having a plurality of wiring layers stacked therein with an interlayer insulating layer interposed in between;

a plurality of structures that is provided on the second surface of the semiconductor substrate in the multilayer wiring layer; and a light reflecting layer that is provided in the multilayer wiring layer, the light reflecting layer forming a reflective region or a non-reflective region in a region with the interlayer insulating layer interposed in between, the region having none of the structures formed therein, the reflective region being substantially symmetrical with respect to an optical center of the pixel, the non-reflective region being substantially symmetrical with respect to the optical center of the pixel.

(2)

The imaging element according to (1), in which the light reflecting layer is formed to be substantially symmetrical with respect to the optical center of the pixel.

(3)

The imaging element according to (1) or (2), in which the light reflecting layer has an opening.

(4)

The imaging element according to (3), in which the opening is formed to be substantially symmetrical, the opening including the optical center of the pixel.

(5)

The imaging element according to any one of (1) to (4), in which the plurality of structures is disposed to be asymmetrical in the pixel in a plan view.

(6)

The imaging element according to any one of (1) to (5), including a first pixel and a second pixel as the pixels, the first pixel and the second pixel being adjacent to each other, in which the light reflecting layer is formed to be substantially symmetrical by using a region between the first pixel and the second pixel as a center.

(7)

The imaging element according to (6), in which a portion of a plurality of structures is shared between the first pixel and the second pixel.

(8)

The imaging element according to any one of (1) to (7), in which the light reflecting layer is provided to overlap with a portion of the plurality of structures in a plan view.

(9)

The imaging element according to any one of (1) to (8), in which the plurality of structures includes a floating diffusion, a transfer transistor, a reset transistor, an amplification transistor, and a selection transistor, the floating diffusion performing electric charge voltage conversion to convert signal charge generated by the light receiving section into a voltage signal, the transfer transistor transferring the signal charge generated by the light receiving section to the floating diffusion, the reset transistor resetting a potential of the floating diffusion to a predetermined potential, the amplification transistor serving an input section of the voltage signal held by the floating diffusion, the selection transistor controlling an output timing of the voltage signal from the amplification transistor.

(10)

The imaging element according to (8) or (9), further including an electric charge holding section that is provided for each of the pixels as the plurality of structures, the electric charge holding section accumulating the electric charge generated by the light receiving section.

(11)

The imaging element according to any one of (1) to (10), in which the light reflecting layer includes an uneven structure on a surface opposed to the second surface of the semiconductor substrate.

(12)

The imaging element according to (11), in which the uneven structure has a shape that is substantially symmetrical with respect to the optical center.

(13)

The imaging element according to any one of (1) to (12), further including a light reflection control layer above the second surface of the semiconductor substrate, the light reflection control layer having different refractive indexes in a plane.

(14)

The imaging element according to (13), in which the light reflection control layer is formed by using metamaterials having different refractive indexes from each other.

(15)

The imaging element according to (13) or (14), in which the light reflecting layer includes a meta-lens.

(16)

The imaging element according to any one of (1) to (15), in which the semiconductor substrate includes an uneven structure on the second surface.

(17)

The imaging element according to (16), in which the semiconductor substrate has a curved section as the uneven structure, the curved section being substantially symmetrical with respect the optical center.

(18)

The imaging element according to (16) or (17), in which a reflective film is formed on a surface of the uneven structure.

(19)

The imaging element according to any one of (1) to (18), further including a pixel section in which a plurality of pixels is two two-dimensionally disposed in a matrix, in which light reflecting layers provided in the plurality of pixels included in the pixel section are formed to cause at least one of the reflective regions or the non-reflective regions to shift from the optical centers of the pixels as viewed from a middle of the pixel section toward a peripheral portion.

(20)

The imaging element according to any one of (1) to (19), in which the light reflecting layer is formed to include a metal material.

(21)

The imaging element according to any one of (1) to (20), in which the light reflecting layer is formed by using a dielectric multilayer film.

(22)
The imaging element according to any one of (1) to (21), in which the light reflecting layer is formed by a wiring layer that is provided closest to the second surface side of the semiconductor substrate among the plurality of wiring layers stacked with the interlayer insulating layer interposed in between.

(23)
An imaging device including
an imaging element including
a semiconductor substrate having a first surface and a second surface, the first surface serving as a light incidence surface, the second surface being opposite to the first surface, the semiconductor substrate including a light receiving section for each of pixels, the light receiving section generating electric charge through photoelectric conversion, the electric charge corresponding to an amount of received light,
a multilayer wiring layer that is provided on the second surface side of the semiconductor substrate, the multilayer wiring layer having a plurality of wiring layers stacked therein with an interlayer insulating layer interposed in between,
a plurality of structures that is provided on the second surface of the semiconductor substrate in the multilayer wiring layer, and
a light reflecting layer that is provided in the multilayer wiring layer, the light reflecting layer forming a reflective region or a non-reflective region in a region with the interlayer insulating layer interposed in between, the region having none of the structures formed therein, the reflective region being substantially symmetrical with respect to an optical center of the pixel, the non-reflective region being substantially symmetrical with respect to the optical center of the pixel.

This application claims the priority on the basis of Japanese Patent Application No. 2020-095062 filed with Japan Patent Office on May 29, 2020, the entire contents of which are incorporated in this application by reference.

It should be understood by those skilled in the art that various modifications, combinations, sub-combinations, and alterations may occur depending on design requirements and other factors insofar as they are within the scope of the appended claims or the equivalents thereof

The invention claimed is:
1. An imaging element, comprising:
a semiconductor substrate having a first surface and a second surface, the first surface serving as a light incidence surface, the second surface being opposite to the first surface, the semiconductor substrate including a light receiving section for each pixel included in a plurality of pixels, the light receiving section generating electric charge through photoelectric conversion, the electric charge corresponding to an amount of received light;
a multilayer wiring layer that is provided on a second surface side of the semiconductor substrate, the multilayer wiring layer having a plurality of wiring layers stacked therein with an interlayer insulating layer interposed in between;
a plurality of structures that is provided on the second surface of the semiconductor substrate in the multilayer wiring layer; and
a light reflecting layer that is provided in the multilayer wiring layer,
wherein the light reflecting layer forms a reflective region and a non-reflective region in a region with the interlayer insulating layer interposed in between,
wherein the region has none of the structures formed therein,
wherein the reflective region is substantially symmetrical with respect to an optical center of each pixel included in the plurality of pixels,
wherein the non-reflective region is substantially symmetrical with respect to the optical center of each pixel included in the plurality of pixels,
wherein, in each pixel included in the plurality of pixels, the reflective region surrounds the non-reflective region, and
wherein the light reflecting layer includes an uneven structure on a surface opposed to the second surface of the semiconductor substrate.

2. The imaging element according to claim 1, wherein the light reflecting layer is formed to be substantially symmetrical with respect to the optical center of each pixel included in the plurality of pixels.

3. The imaging element according to claim 1, wherein the light reflecting layer has an opening.

4. The imaging element according to claim 3, wherein the opening is formed to be substantially symmetrical, the opening including the optical center of the pixel.

5. The imaging element according to claim 1, wherein the plurality of structures is disposed to be asymmetrical in the pixel in a plan view.

6. The imaging element according to claim 1, further comprising:
a first pixel and a second pixel as the pixels, the first pixel and the second pixel being adjacent to each other, wherein
the light reflecting layer is formed to be substantially symmetrical by using a region between the first pixel and the second pixel as a center.

7. The imaging element according to claim 6, wherein a portion of a plurality of structures is shared between the first pixel and the second pixel.

8. The imaging element according to claim 1, wherein the light reflecting layer is provided to overlap with a portion of the plurality of structures in a plan view.

9. The imaging element according to claim 1, wherein the plurality of structures includes a floating diffusion, a transfer transistor, a reset transistor, an amplification transistor, and a selection transistor, the floating diffusion performing electric charge voltage conversion to convert signal charge generated by the light receiving section into a voltage signal, the transfer transistor transferring the signal charge generated by the light receiving section to the floating diffusion, the reset transistor resetting a potential of the floating diffusion to a predetermined potential, the amplification transistor serving an input section of the voltage signal held by the floating diffusion, the selection transistor controlling an output timing of the voltage signal from the amplification transistor.

10. The imaging element according to claim 8, further comprising an electric charge holding section that is provided for each of the pixels as the plurality of structures, the electric charge holding section accumulating the electric charge generated by the light receiving section.

11. The imaging element according to claim 1, wherein the uneven structure has a shape that is substantially symmetrical with respect to the optical center.

12. The imaging element according to claim 1, further comprising a pixel section in which the pixels included in the plurality of pixels are two two-dimensionally disposed in a matrix, wherein
light reflecting layers provided in the plurality of pixels included in the pixel section are formed to cause at least one of the reflective regions or the non-reflective regions to shift from the optical centers of the plurality of pixels as viewed from a middle of the pixel section toward a peripheral portion.

13. An imaging element, comprising:
a semiconductor substrate having a first surface and a second surface, the first surface serving as a light incidence surface, the second surface being opposite to the first surface, the semiconductor substrate including a light receiving section for each pixel included in a plurality of pixels, the light receiving section generating electric charge through photoelectric conversion, the electric charge corresponding to an amount of received light;
a multilayer wiring layer that is provided on a second surface side of the semiconductor substrate, the multilayer wiring layer having a plurality of wiring layers stacked therein with an interlayer insulating layer interposed in between;
a plurality of structures that is provided on the second surface of the semiconductor substrate in the multilayer wiring layer;
a light reflecting layer that is provided in the multilayer wiring layer,
wherein the light reflecting layer forms a reflective region and a non-reflective region in a region with the interlayer insulating layer interposed in between,
wherein the region has none of the structures formed therein,
wherein the reflective region is substantially symmetrical with respect to an optical center of each pixel included in the plurality of pixels,
wherein the non-reflective region is substantially symmetrical with respect to the optical center of each pixel in the plurality of pixels; and
a light reflection control layer above the second surface of the semiconductor substrate, the light reflection control layer having different refractive indexes in a plane.

14. The imaging element according to claim 13, wherein the light reflection control layer is formed by using metamaterials having different refractive indexes from each other.

15. The imaging element according to claim 13, wherein the light reflecting layer includes a meta-lens.

16. The imaging element according to claim 13, wherein the light reflecting layer includes an uneven structure on a surface opposed to the second surface of the semiconductor substrate.

17. An imaging element, comprising:
a semiconductor substrate having a first surface and a second surface, the first surface serving as a light incidence surface, the second surface being opposite to the first surface, the semiconductor substrate including a light receiving section for each pixel included in a plurality of pixels, the light receiving section generating electric charge through photoelectric conversion, the electric charge corresponding to an amount of received light;
a multilayer wiring layer that is provided on a second surface side of the semiconductor substrate, the multilayer wiring layer having a plurality of wiring layers stacked therein with an interlayer insulating layer interposed in between;
a plurality of structures that is provided on the second surface of the semiconductor substrate in the multilayer wiring layer; and
a light reflecting layer that is provided in the multilayer wiring layer,
wherein the light reflecting layer forms a reflective region and a non-reflective region in a region with the interlayer insulating layer interposed in between,
wherein the region has none of the structures formed therein,
wherein the reflective region is substantially symmetrical with respect to an optical center of each pixel included in the plurality of pixels,
wherein the non-reflective region is substantially symmetrical with respect to the optical center of each pixel included in the plurality of pixels,
wherein, in each pixel included in the plurality of pixels, the reflective region surrounds the non-reflective region, and
wherein the semiconductor substrate includes an uneven structure on the second surface.

18. The imaging element according to claim 17, wherein the semiconductor substrate has a curved section as the uneven structure, the curved section being substantially symmetrical with respect the optical center.

19. The imaging element according to claim 17, wherein a reflective film is formed on a surface of the uneven structure.

20. An imaging element, comprising:
a semiconductor substrate having a first surface and a second surface, the first surface serving as a light incidence surface, the second surface being opposite to the first surface, the semiconductor substrate including a light receiving section for each pixel included in a plurality of pixels, the light receiving section generating electric charge through photoelectric conversion, the electric charge corresponding to an amount of received light;
a multilayer wiring layer that is provided on a second surface side of the semiconductor substrate, the multilayer wiring layer having a plurality of wiring layers stacked therein with an interlayer insulating layer interposed in between;
a plurality of structures that is provided on the second surface of the semiconductor substrate in the multilayer wiring layer; and
a light reflecting layer that is provided in the multilayer wiring layer,
wherein the light reflecting layer forms a reflective region and a non-reflective region in a region with the interlayer insulating layer interposed in between,
wherein the region has none of the structures formed therein,
wherein the reflective region is substantially symmetrical with respect to an optical center of each pixel included in the plurality of pixels,
wherein the non-reflective region is substantially symmetrical with respect to the optical center of each pixel included in the plurality of pixels,
wherein, in each pixel included in the plurality of pixels, the reflective region surrounds the non-reflective region, and wherein the plurality of structures is disposed to be asymmetrical in the pixel in a plan view.

* * * * *